United States Patent [19]
Bassett et al.

[11] Patent Number: 5,446,366
[45] Date of Patent: Aug. 29, 1995

[54] BOOST CONVERTER POWER SUPPLY WITH REDUCED LOSSES, CONTROL CIRCUIT AND METHOD THEREFOR

[75] Inventors: John A. Bassett, San Ramon; Arthur B. Odell, Cupertino, both of Calif.

[73] Assignee: Computer Products, Inc., Fremont, Calif.

[21] Appl. No.: 193,339

[22] Filed: Feb. 8, 1994

[51] Int. Cl.[6] ............................................. G05F 1/10
[52] U.S. Cl. ..................................................... 323/222
[58] Field of Search ...................... 323/222, 326, 288; 363/26, 20, 21

[56] References Cited

U.S. PATENT DOCUMENTS

| | | | |
|---|---|---|---|
| 4,412,277 | 10/1983 | Mitchell | 363/81 |
| 4,437,146 | 5/1984 | Carpenter | 363/21 |
| 4,677,366 | 6/1987 | Wilkinson et al. | 323/222 |
| 4,853,837 | 8/1989 | Gulczynski | 323/222 X |
| 4,940,929 | 7/1990 | Williams | 323/222 |
| 4,974,141 | 11/1990 | Severinsky et al. | 363/81 |
| 5,066,900 | 11/1991 | Bassett | 323/224 |
| 5,067,066 | 11/1991 | Chida | 323/222 X |
| 5,088,019 | 2/1992 | Williams et al. | 363/69 |
| 5,097,196 | 3/1992 | Schoneman | 323/222 |
| 5,126,931 | 6/1992 | Jitaru | 363/21 |
| 5,134,355 | 6/1992 | Hastings | 323/222 X |
| 5,173,846 | 12/1992 | Smith | 363/20 |
| 5,180,964 | 1/1993 | Ewing | 323/222 |
| 5,206,800 | 4/1993 | Smith | 363/21 |
| 5,224,025 | 6/1993 | Divan et al. | 363/16 |
| 5,227,941 | 7/1993 | Rubin | 361/18 |
| 5,231,563 | 7/1993 | Jitaru | 363/98 |
| 5,262,930 | 11/1993 | Hua et al. | 323/222 X |
| 5,264,780 | 11/1993 | Bruer et al. | 323/222 |

OTHER PUBLICATIONS

L. Yang et al., "Analysis and Design of Boost Zero-Voltage-Transition PWM Converter", IEEE 0-78-03-0982-0/93, pp. 707-713.

Ionel Dan Jitaru, "Soft Transitions Power Factor Correction Circuit", HFPC, May 1993 Proceedings, pp. 202-208.

*Primary Examiner*—Thomas M. Dougherty
*Assistant Examiner*—E. To
*Attorney, Agent, or Firm*—Skjerven, Morrill, MacPherson, Franklin & Friel; Kenneth E. Leeds; T. Lester Wallace

[57] ABSTRACT

A boost converter power supply circuit uses energy from a diode recovery current which flows in the blocking diode at diode commutation to discharge a capacitance associated with the main switch of the boost converter in order to achieve zero voltage switching. The diode recovery current energy is initially captured in an inductor, is then transferred to a capacitor, and is then transferred back to the inductor prior to the main switch being switched on. In accordance with another embodiment, a control circuit for controlling a boost converter to achieve power factor correction is disclosed which does not use a high gain input current feedback loop. The control circuit responds relatively quickly to output load changes, thereby overcoming disadvantages of prior art control circuits. Because the control circuit does not require an X-Y multiplier, the control circuit lends itself to realization in integrated circuit form. The boost converter can be practiced without the control circuit, the control circuit can be practiced without the boost converter, and the control circuit can be used to control the boost converter.

27 Claims, 33 Drawing Sheets

($t_0$<time<$t_1$)

($t_1$<time<$t_2$)

($t_2$<time<$t_3$)

($t_3$<time<$t_4$)

($t_4$<time<$t_5$)

($t_5$<time<$t_6$)

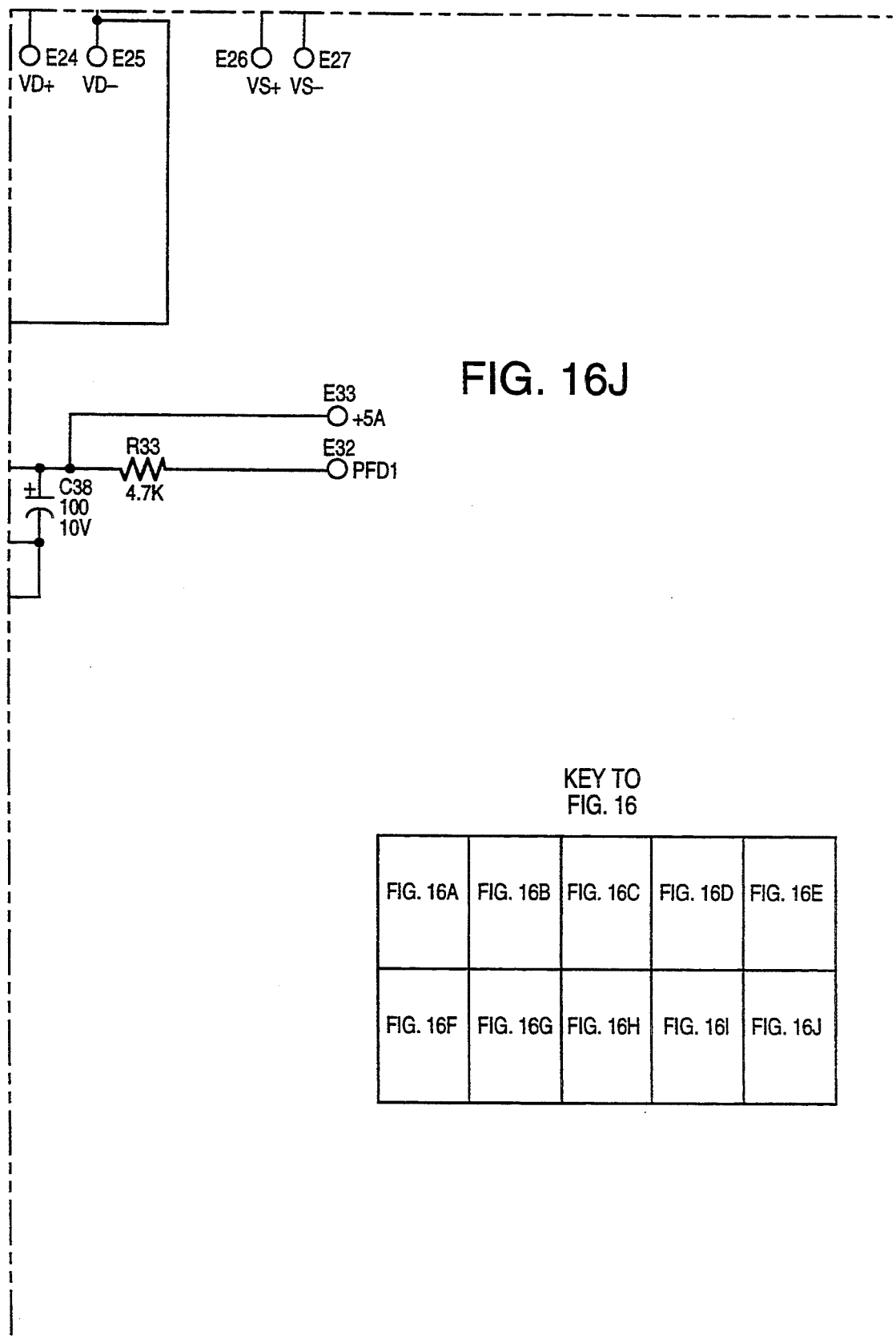

BOOST CONVERTER POWER SUPPLY WITH REDUCED LOSSES, CONTROL CIRCUIT AND METHOD THEREFOR

FIELD OF THE INVENTION

The present invention relates to power supplies. More particularly, the present invention relates to reducing losses in boost converter power supplies and to control circuits which control boost converter power supplies to achieve power factor correction.

BACKGROUND INFORMATION

FIG. 1 (Prior Art) shows a power supply 1 which converts an alternating current (AC) sinewave input supply voltage $V_{IN}$ received from a power source into a substantially direct current (DC) output supply voltage $V_{OUT1}$. The substantially DC voltage $V_{OUT1}$ can be subsequently regulated by electronic means for subsequent use by electronic circuitry. Power supply 1 comprises four diodes D1–D4 and a capacitor C1. Resistance R1 represents a load resistor.

FIG. 2 (Prior Art) illustrates operation of the power supply of FIG. 1. When node N1 is positive with respect to node N0 during a first part of the sinewave of AC voltage $V_{IN}$, the voltage on node N1 is positive with respect to the voltage on node N0 but is not positive with respect to the voltage on node N3 due to the fact that capacitor C1 has a charge. Diodes D2 and D4 are therefore not forward biased and no current flows into capacitor C1. This period of time is represented in FIG. 2 as time period $t_A$. When the voltage on node N1 increases to the point that the voltage on node N1 is two forward bias diode voltage drops greater than the voltage on capacitor C1, diodes D2 and D3 conduct. Current flows from node N1, through forward biased diode D2, through capacitor C1, through forward biased diode D3, and to node N0. Capacitor C1 is therefore charged as voltage $V_{IN}$ increases to its peak voltage. This period of time is represented in FIG. 2 as time period $t_B$. As the voltage $V_{IN}$ decreases from the peak voltage, the voltage on capacitor C1 is positive with respect to the voltage on node N1. Diode D2 is therefore reverse biased. The voltage on capacitor C1 therefore cannot discharge through the diodes. This condition remains as the voltage $V_{IN}$ decreases to ground potential. This period of time is represented in FIG. 2 as time period $t_C$. During the next half cycle of the sinewave, the voltage on node N0 is positive with respect to the voltage on node N1. During the time period $t_D$, the voltage on node N0 is not adequately high with respect to N1 to forward bias diodes D4 and D1 due to the charge on capacitor C1. During time period $t_E$, however, the voltage on node N0 is adequately high with respect to the voltage on node N1 so that current flows through forward biased diode D4, through capacitor C1, through forward biased diode D1 and to node N1.

It is therefore seen that the current $i_{IN1}$ flowing into the power supply 1 is non-sinusoidal whereas the voltage supplied to the power supply 1 is substantially sinusoidal. The power factor of the power supply, which may be defined as:

$$P.F. = \frac{\text{average power}}{V_{RMS} I_{RMS}} \quad \text{(equ. 1)}$$

is therefore not unity. This is undesirable.

FIG. 3 (Prior Art) shows a power supply circuit 2, sometimes called a boost converter. If controlled appropriately, the boost converter may be made to have a power factor closer to unity (i.e., to provide power factor correction). Boost converter 2 comprises an inductor L1, a switch S1 having an associated capacitance C2, a diode D5 having a diode recovery current of magnitude $i_R$, and an output capacitance C1. Resistor R1 represents a load resistance on the power supply.

FIG. 4 (Prior Art) shows conventional boost converter 2 controlled by a conventional control circuit 3 which modulates the on/off duty cycle of switch S1 in order to achieve a power factor close to unity. Control circuit 3 comprises a voltage divider 4, 5 for developing a sine wave reference voltage from the input voltage $V_{IN}$, an X-Y multiplier circuit 6 for varying the reference voltage in response to an error voltage, output voltage error amplifier 7 for developing the error voltage by comparing the boost converter output voltage $V_{OUT2}$ to a fixed reference voltage $V_{REF}$, a resistor 8 for generating a voltage signal proportional to the input current of the boost converter, a high gain current error amplifier 9 for comparing the input current signal to the output signal of the multiplier circuit to produce an input current error signal, and structure 10 for converting the input current error signal into a pulse train to control the on/off duty cycle time of switch S1 in a manner to decrease or eliminate the current error.

FIG. 5 (Prior Art) is a diagram illustrative of waveforms associated with the operation of boost converter 2 under the control of control circuit 3. In operation, the voltage on node N1 with respect to the voltage on node N0 is a fullwave rectified version of the sinewave voltage $V_{IN}$. During the first half period of the sinewave $V_{IN}$, the voltage on node N1 follows the voltage $V_{IN}$. During the second half period, however, the voltage on node N1 is rectified as illustrated in FIG. 5 by the dashed waveform 3A. During a first time period $t_F$, switch S1 is controlled to connect node N2 to node N0. Current therefore flows from node N1, through inductor L1 to node N2, and through switch S1 to node N0. Because the voltage on node N2 is coupled to node N0 and because capacitance C1 is charged so that a positive voltage is present on node N3, diode D5 is reverse biased. No current therefore flows into capacitor C1 from node N2. The current flowing through inductor L1, however, causes energy to be stored in inductor L1. When, during a second time period $t_G$, switch S1 is opened, node N2 is decoupled from node N0. Inductor L1 therefore causes the voltage on node N2 to increase in accordance with the relation:

$$V = L\frac{di}{dt} \quad \text{(equ. 2)}$$

With the voltage on node N2 being positive with respect to the voltage on node N3, diode D5 is forward biased and current flows through diode D5 and into capacitor C1. After the energy stored in inductor L1 has been transferred to capacitor C1 through diode D5, switch S1 is closed. Node N2 is therefore again coupled to node N0, diode D5 again becomes reverse biased, and current flowing through inductor L1 to node N0 causes another quantity of energy to be stored in inductor L1. This process of closing switch S1 to store energy in inductor L1 and then opening switch S1 to move that energy from the inductor into the capacitor C1 to charge capacitor C1 is repeated multiple times throughout the period of input voltage $V_{IN}$. Due to the control of control circuit 3, the current waveform $i_{IN2}$ flowing into the boost converter power supply as illustrated in FIG. 5 more closely represents the sinewave of the input voltage $V_{IN}$. Accordingly, the boost converter 2 has a power factor closer to unity than does the power supply circuit of FIG. 1.

The boost converter power supply of FIGS. 3 and 4, however, is somewhat inefficient due to power losses. First, charge is stored in capacitance C2 when a high voltage is on node N2 and when switch S1 is open. When switch S1 is then closed to begin to store energy in inductor L1, switch S1 couples the two terminals of charged capacitance C2 together. The energy stored in capacitance C2 is therefore dissipated and lost without being resupplied to the input or being supplied to the output of the power supply. Second, when diode D5 is commutated from being forward biased to being reverse biased when switch S1 is closed, diode recovery current flows for a short period of time. The magnitude of this diode recovery current for a state of the art power diode may be many times the magnitude of the forward current ordinarily flowing from node N2 to node N3 during normal operation of the power supply. This diode recovery current, which flows from diode D5 and through closed switch S1 to node N0, does not contribute to the storage of energy in inductor L1, does not flow into capacitor C1, and therefore also constitutes a loss of energy.

SUMMARY

In accordance with the present invention, a boost converter and associated methods are disclosed which 1) reduce losses incurred by prior art boost converters during commutation of the boost converter blocking diode, and which 2) reduce losses incurred by prior art boost converters due to discharging of the intrinsic and/or stray capacitance associated with the boost converter switch. One embodiment of the boost converter of the present invention can be controlled by known boost converter control circuits in order to achieve a substantially sinusoidal input current and to achieve power factor correction.

In accordance with another embodiment of the present invention, an improved control circuit and associated methods are disclosed. In some embodiments, the improved control circuit does not involve the sinewave reference voltage, the multiplier circuit and the high gain current error amplifier of the prior art control circuit of FIG. 4. A control circuit in accordance with some embodiments of the present invention is therefore less complex and more easily realizable in integrated circuit form. A control circuit in accordance with some embodiments of the present invention responds quickly to output load changes, thereby overcoming disadvantages of the typically low band width output voltage error amplifiers of prior art control circuits.

In a preferred embodiment, the improved boost converter is controlled by the improved control circuit.

BRIEF DESCRIPTION OF THE DRAWINGS

FIGS. 16A–16J are detailed circuit diagrams of a boost converter power supply circuit in accordance with an embodiment of the present invention.

DETAILED DESCRIPTION OF PREFERRED EMBODIMENTS

BOOST CONVERTER

Figure 6:
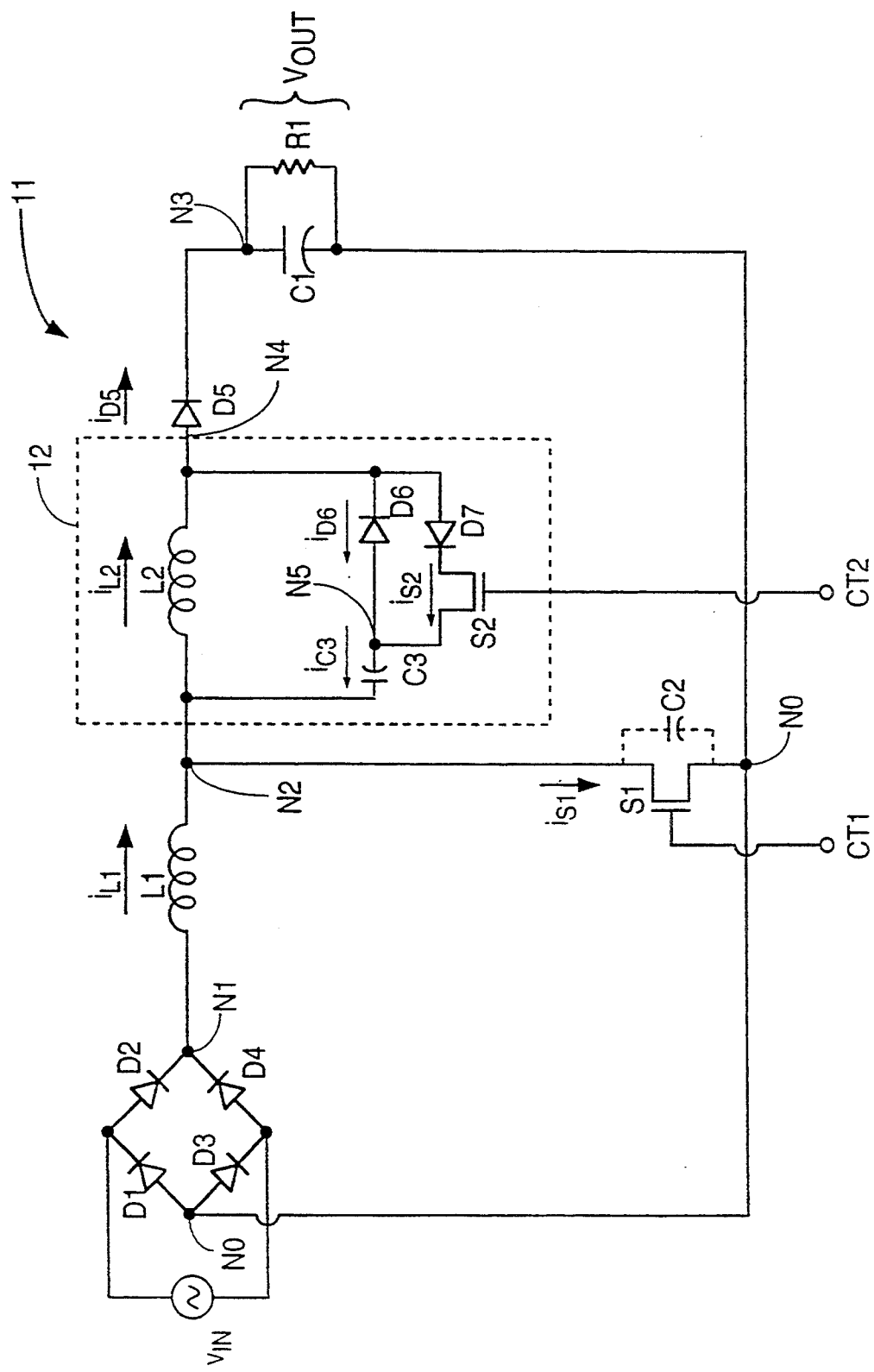
FIG. 6 is a simplified circuit diagram of a boost converter power supply circuit in accordance with an embodiment of the present invention.

FIG. 6 is a circuit diagram of a boost converter power supply circuit 11 in accordance with an embodiment of the present invention. A source of a sinusoidal voltage $V_{IN}$ is shown coupled to a diode bridge comprising four diodes D1–D4. Boost converter power supply circuit 11 comprises an inductor L1, a switch S1 having an associated capacitance C2, a switch capacitance discharge circuit 12, a diode D5 and a capacitor C1. Resistance R1 represents a load resistance on the power supply circuit 11.

In the specific embodiment illustrated in FIG. 6, switch capacitance discharge circuit 12 has a first terminal coupled to node N2, a second terminal coupled to node N4, and a control terminal CT2. The specific embodiment of switch capacitance discharge circuit 12 comprises an inductor L2, a capacitor C3, two diodes D6 and D7 and a switch S2. Switch S1 turns on and off quickly in order to reduce switching loss as it begins to carry current. In some embodiments, switch S1 is a field effect transistor (FET) and capacitance C2 is the intrinsic capacitance of field effect transistor S1.

Figure 7A:
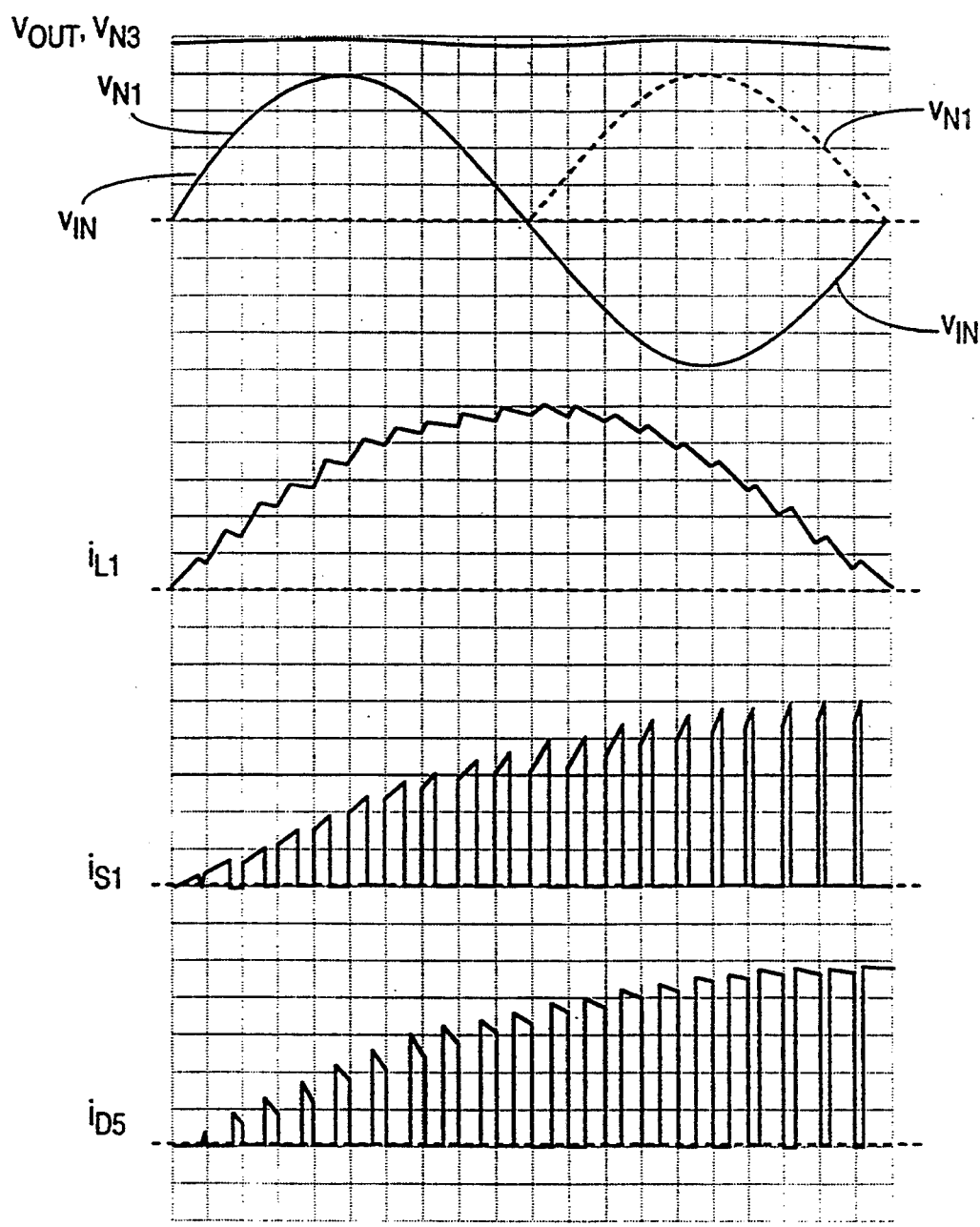
FIGS. 7A–7B are simplified waveform diagrams illustrative of an operation of the boost converter power supply circuit of FIG. 6. The waveforms of FIGS. 7A–7B were not recorded from an operating circuit and were not produced by simulation, but rather were constructed for illustrative purposes only. The present invention need not necessarily involve currents and voltages that are identical to those currents and voltages depicted in FIGS. 7A–7B.
Figure 7B:
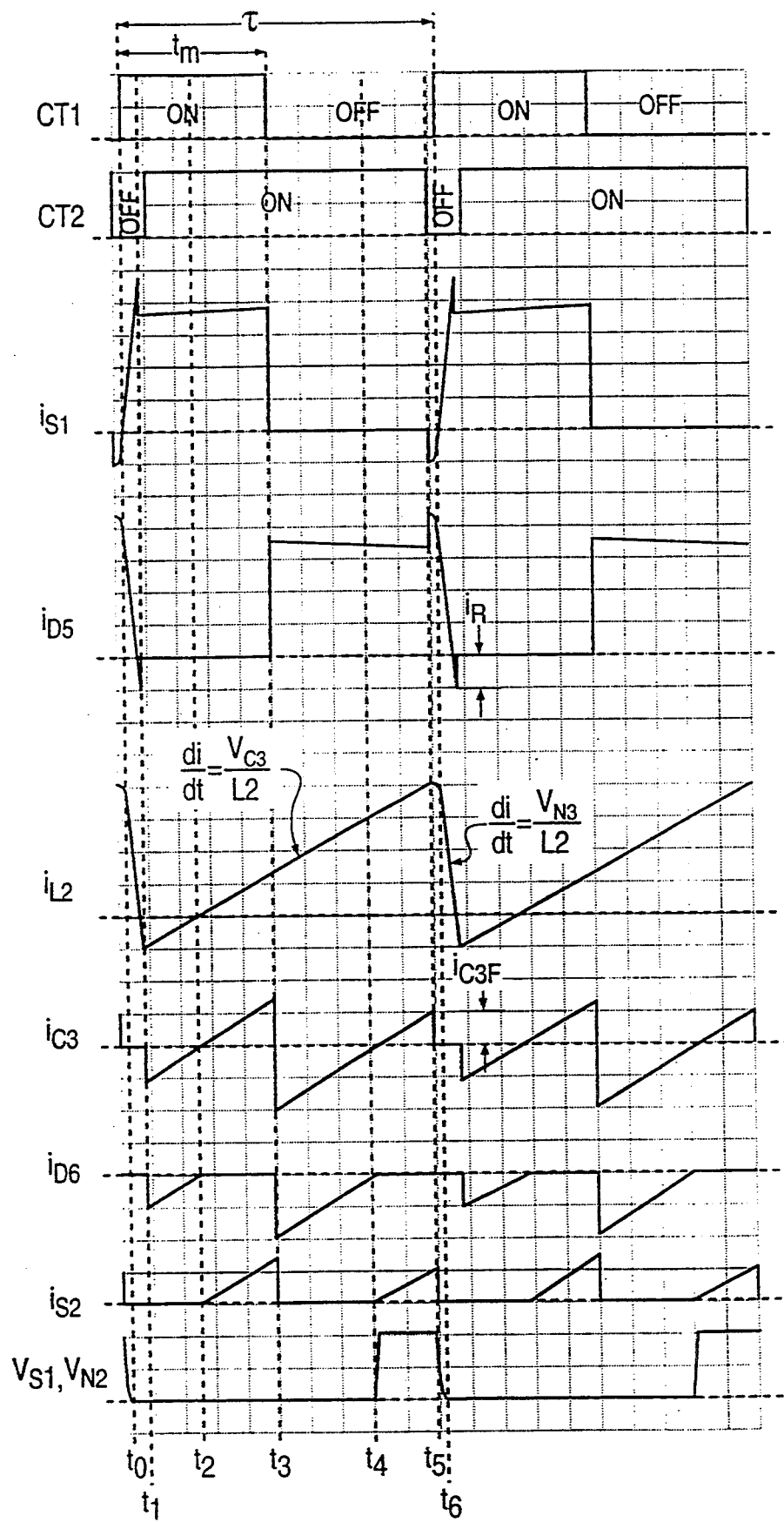

FIGS. 7A and 7B illustrate an operation of boost converter power supply circuit 11. The diode bridge comprising diodes D1–D4 converts the sinewave input voltage signal $V_{IN}$ into a corresponding full wave rectified voltage signal as represented by the waveforms $V_{IN}$ and $V_{N1}$, respectively, in FIG. 7A. The waveform $i_{L1}$ in FIG. 7A represents the current $i_{L1}$ flowing in inductor L1 during the first half cycle of the input voltage waveform $V_{IN}$. Waveforms $i_{S1}$ and $i_{D5}$ represent the currents flowing through switch S1 and diode D5, respectively, during the first quarter cycle of the input voltage $V_{IN}$. It is seen that numerous pulses of current flow through switch S1 during a single quarter cycle of input voltage $V_{IN}$. As can be seen from the waveforms labeled $i_{S1}$ and $i_{D5}$ in FIG. 7B, the waveforms of FIG. 7B illustrate two of the many pulses of switch and diode current illustrated in FIG. 7A.

FIG. 8A–8F are simplified circuit diagrams illustrative of an operation of the circuit of FIG. 6. Because FIG. 7B represents but a small portion of the half cycle of the sinusoidal voltage $V_{IN}$, the voltage on node N1 with respect to node N0 is assumed for purposes of explanation to be constant throughout the period of time illustrated in FIG. 7B. The diode bridge is therefore omitted from the simplified circuit diagram of FIG. 8A and node N1 is assumed to be driven with a constant voltage $V_{N1}$ with respect to node N0.

Figure 8A:
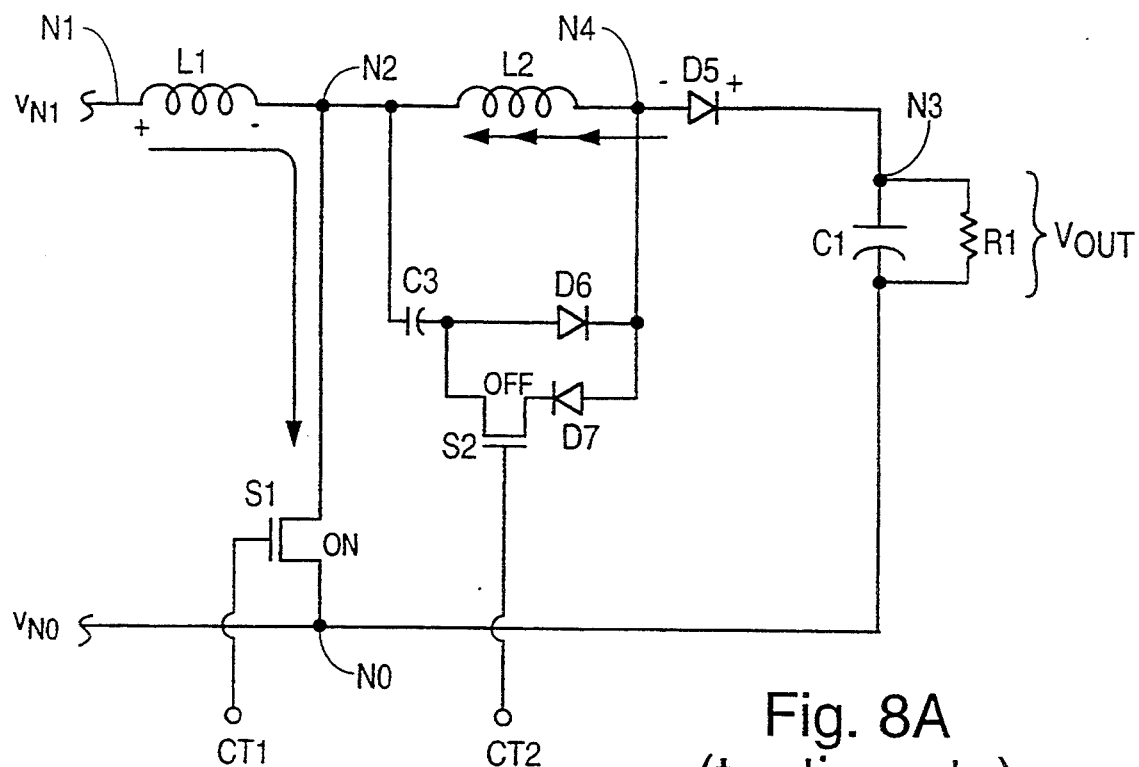
FIGS. 8A–8F are simplified circuit diagrams illustrating an operation of the boost converter power supply circuit of FIG. 6.

FIG. 8A illustrates operation of the circuit of FIG. 6 between times $t_0$ and $t_1$. At time $t_0$, a signal on control terminal CT1 transitions from low to high making switch S1 conductive. Current therefore begins to flow from node N1, through inductor L1, through switch S1 and to node N0. As represented by the waveform $i_{D5}$ in FIG. 7B, current flow in diode D5 decreases to zero and then goes negative due to a diode recovery current which flows in a reverse direction for a short period of time before time $t_1$. Between times $t_0$ and $t_1$, switch S2 is nonconductive because a signal on control terminal CT2 is low. The diode recovery current therefore must flow into inductor L2 from node N4 and to node N2 as represented by the downward transition of waveform $i_{L2}$ in FIG. 7B and as illustrated in FIG. 8A. Consequently, the rate of change of current in diode D5 is limited by inductor L2.

Because capacitor C2 will be discharged later using energy (this energy is first stored in inductor L2) from the diode recovery current, it is important that adequate diode recovery current be allowed to flow. Diode recovery current is due to a removal of an amount of charge from the PN semiconductor junction of the diode D5 when the voltage across diode D5 switches from a positive voltage to a negative voltage. The amount of charge removed from the junction is directly related to the rate of change of current through the diode. Because the rate of change of current $i_{L2}$ is limited by the inductance of inductor L2, the inductance of inductor L2 is properly selected to allow an amount of diode recovery current to flow adequate to discharge capacitance C2.

Figure 8B:
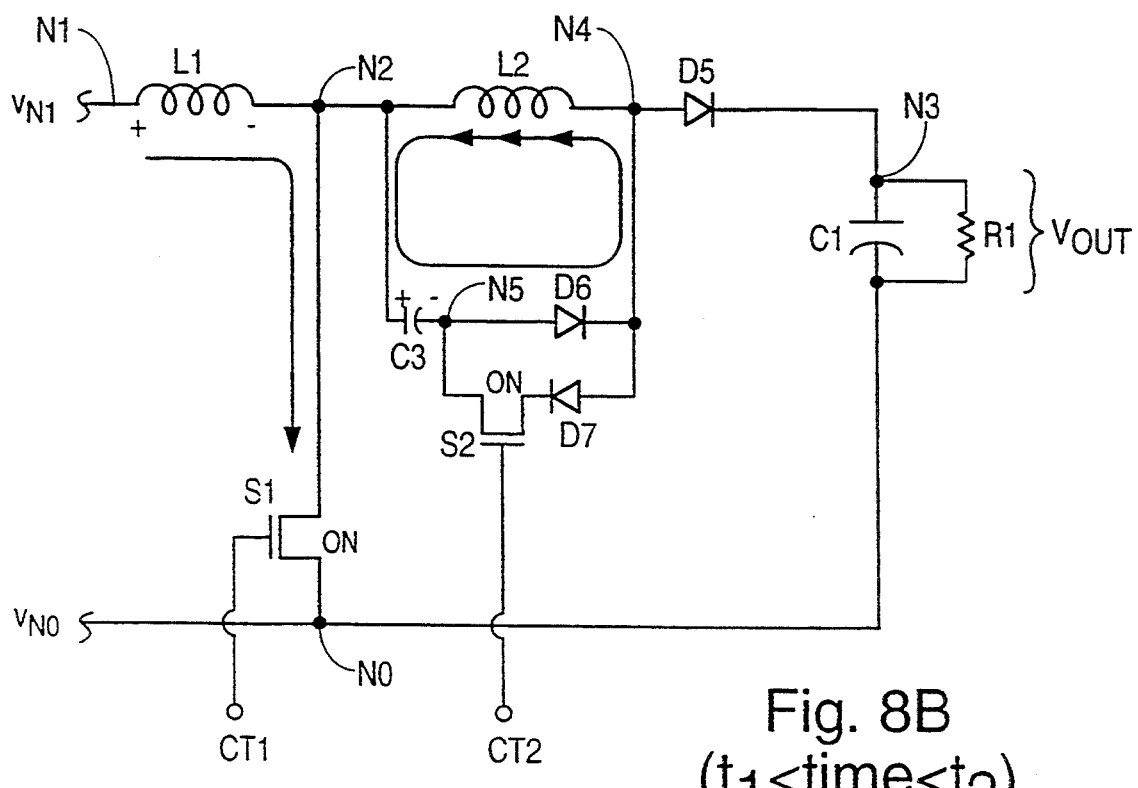

FIG. 8B illustrates operation of the circuit of FIG. 6 between times $t_1$ and $t_2$. When the charge in the junction of diode D5 is exhausted and the flow of diode recovery current from diode D5 stops, the voltage on node N4 decreases and inductor L2 establishes a circulating current flowing through capacitor C3 and through diode D6. This circulating current is represented in FIG. 7B by the corresponding negative current values of the waveforms $i_{L2}$, $i_{C3}$ and $i_{D6}$ between times $t_1$ and $t_2$. The initial magnitude of this circulating current is the peak magnitude of the diode recovery current. This circulating current continues to flow until the energy in inductor L2 is transferred to capacitor C3.

Figure 8C:
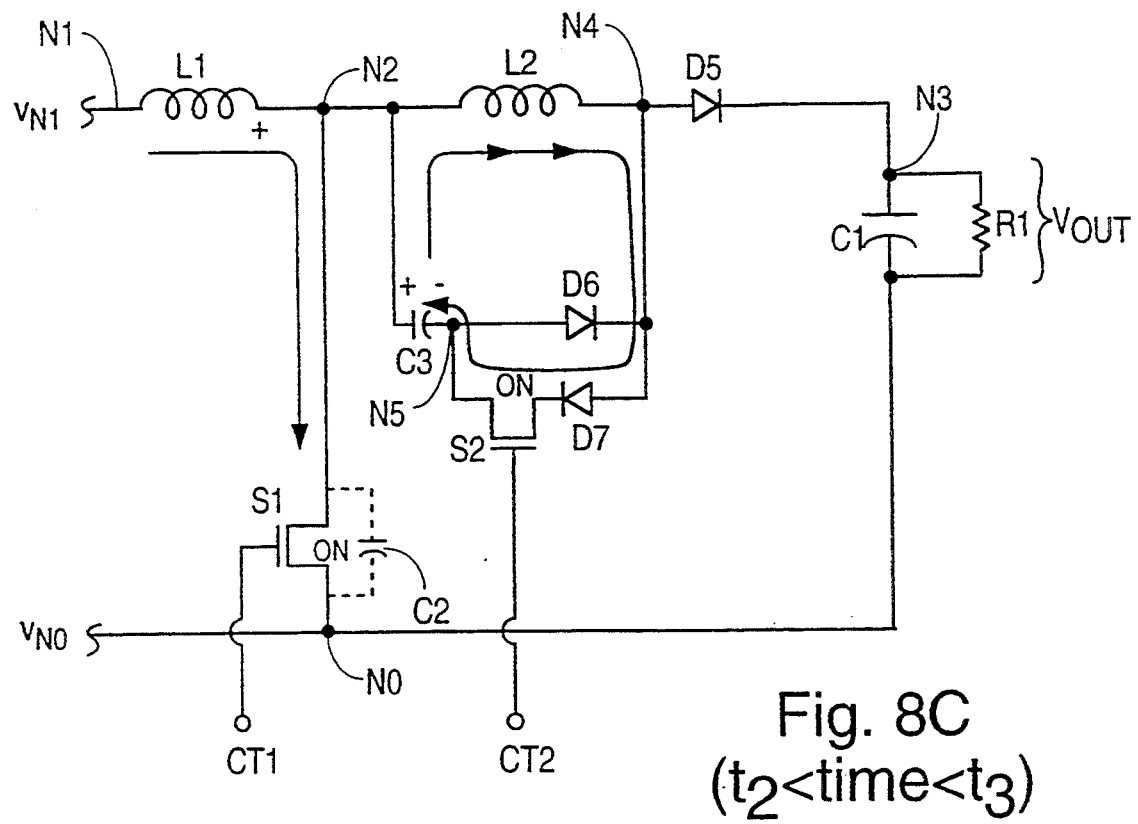

Before the flow of circulating current reaches zero, however, the signal on control terminal CT2 transitions from low to high so that switch S2 is made conductive. Accordingly, when the flow of current between inductor L2 and capacitor C3 attempts to reverse direction at time $t_2$, current is able to flow from a charged plate of capacitor C3 at node N2, through inductor L2 to node N4 in the opposite direction of flow through diode D7, through conductive switch S2, and to an oppositely charged plate of capacitor C3. FIG. 8C illustrates this reversed flow of current between times $t_2$ and $t_3$.

Figure 8D:
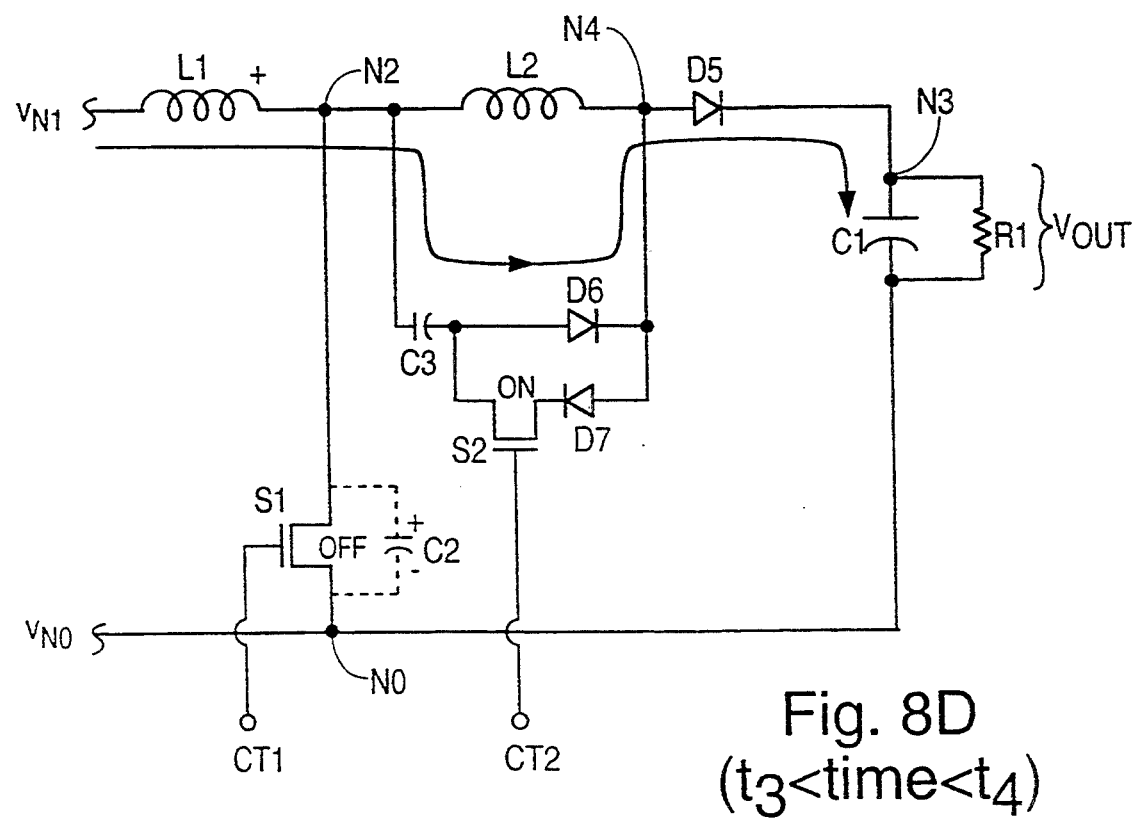

Next, the signal on control terminal CT1 transitions from high to low causing switch S1 to become nonconductive. As illustrated in FIG. 8D, current flowing through inductor L1 which cannot flow through now nonconductive switch S1 initially flows through capacitor C3, through diode D6, through diode D5, and into capacitor C1, thereby charging capacitors C1 and C3. This current, which is a negative current with respect to capacitor C3, subtracts from the increasing current flowing from capacitor C3 in the current loop illustrated in FIG. 8C. The waveform $i_{C3}$ in FIG. 7B therefore shows the rising current waveform to have dropped by a constant value equal to the current previously flowing through inductor L1 at the time $t_3$ when waveform CT1 transitions downward.

Figure 8E:
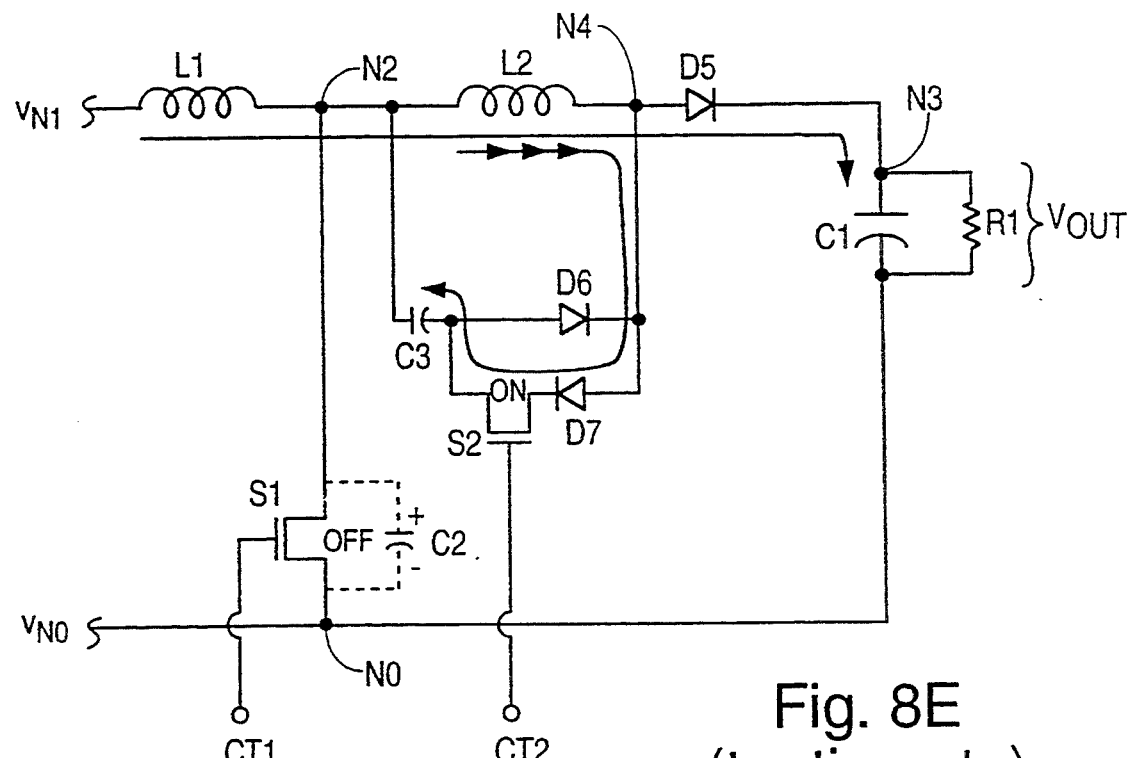

FIG. 8E illustrates the operation of the circuit of FIG. 6 between times $t_4$ and $t_5$. At this point in time, net current flow in capacitor C3 has again reversed and is positive. Current flows in a current loop from node N2, through inductor L2 to node N4, through diode D7, through conductive switch S2, and to capacitor C3. Accordingly, the value of $i_{C3}$ at time $t_5$ is positive.

Figure 8F:
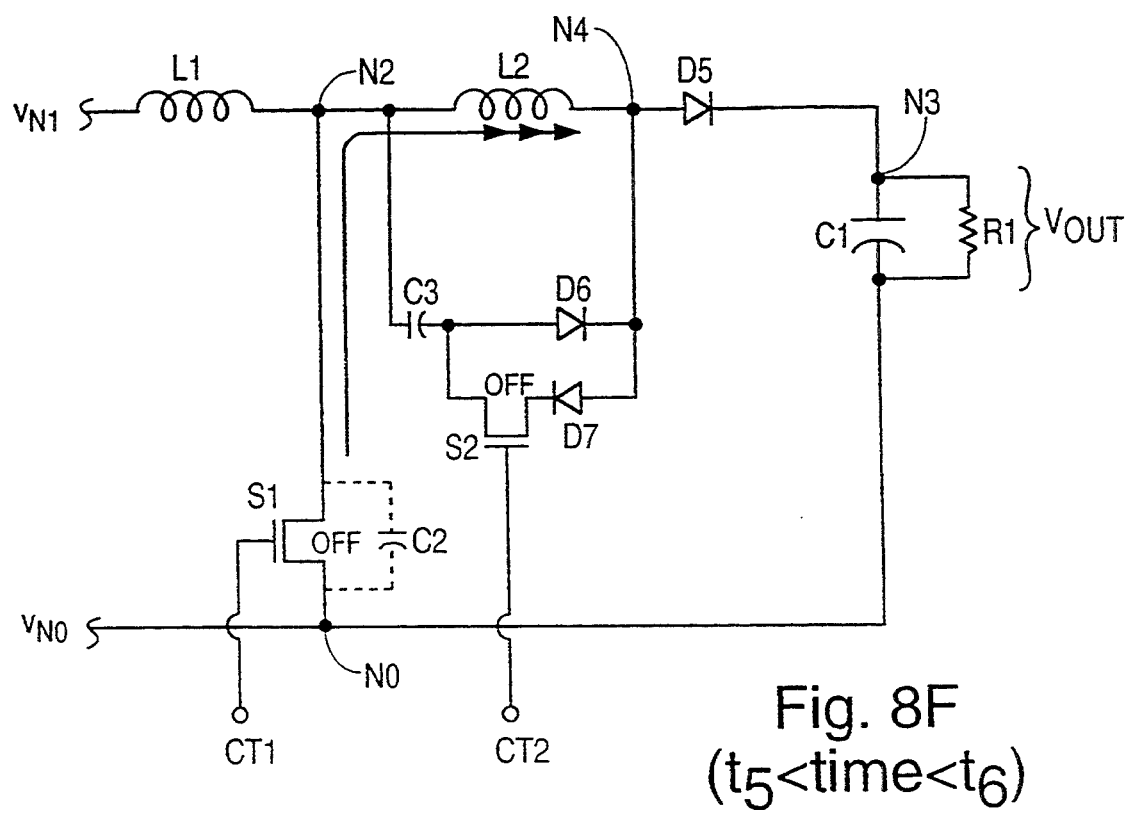

FIG. 8F illustrates operation of the circuit of FIG. 6 between times $t_5$ and $t_6$. The signal on control terminal CT2 transitions from high to low to make switch S2 nonconductive thereby breaking the current loop illustrated in FIG. 8E. Inductor L2, however, functions to maintain current flow from node N2 to node N3 through inductor L2. Capacitance C2 is therefore discharged by inductor L2 as illustrated in FIG. 8F. Current $i_{S1}$ is therefore seen to have a negative value for a short period of time when capacitance C2 is being discharged.

Once the voltage on capacitance C2 has been discharged and the voltage $V_{S1}$ across switch S1 is zero, switch S1 is made conductive by a low to high transition of the signal on terminal CT1. Accordingly, both energy present in capacitance C2 prior to switch S1 being turned on as well as energy stored in inductor L2 from the diode recovery current of D5 are transferred to output capacitor C1 rather than being lost.

In accordance with the presently described specific embodiment, the final current $i_{C3F}$ flowing in capacitor C3 at time $t_5$ must be positive in order to provide current to discharge capacitance C2 of switch S1. In order to determine circuit conditions which result in the final current $i_{C3F}$ being positive at time $t_5$, it can be assumed that over a single switching cycle of switch S1 that the DC voltage on capacitor C3 is substantially constant. Therefore, the net current flow through capacitor C3 is zero over each switching cycle. Assuming that the flat portion of the $i_{C3}$ waveform during switching period $\tau$ is of much shorter duration that is the remainder of the $i_{C3}$ waveform during the remainder of the switching period, the equations 3 and 4 below describe the piecewise continuous current waveform $i_{C3}$ shown in FIG. 7B:

$$i_{C3} = mt - i_R \text{ for } t_1 < t < t_3 \quad \text{(equ. 3)}$$

$$i_{C3} = mt - i_R - i_{L1t3} \text{ for } t_3 < t < \tau \quad \text{(equ. 4)}$$

where the slope m is equal to $L2/V_{C3}$, where $i_R$ is the diode recovery current of diode D5, and where $i_{L1t3}$ is the current flowing in inductor L1 at time $t_3$. Integrating these equations over one switching period $\tau$ to determine the current flowing in capacitor C3 and setting the result equal to zero gives:

$$V_{C3} = \frac{X_{L2}}{\pi} (i_R + i_{L1}(1 - \delta)) \quad \text{(equ. 5)}$$

where $X_{L2} = 2\pi f_s L2$, where $f_s$ is the switching frequency of switch S1, and where $\tau$ is the duty cycle of signal CT1.

The final current in capacitor C3, $i_{C3F}$, is given by equation 4 at time $\tau$. Substituting $\tau$ for t in equation 4 and substituting the right side of equation 5 for $V_{C3}$ in equation 4 gives:

$$i_{C3F} = \frac{X_{L2}}{\pi L2} (I_R + i_{L1}(1 - \delta))\tau - i_R - i_{L1t3} \quad \text{(equ. 6)}$$

In order to control a boost converter to have unity power factor, a control signal is needed that will drive the gate of the main switch S1 with a duty cycle $\delta$:

$$\delta = \frac{V_{OUT} - V_{IN}}{V_{OUT}} \quad \text{(equ. 7)}$$

As is seen from waveform $i_{S1}$ of FIG. 7A, the control signal must control switch S1 to be on a relatively greater portion of each switching period when the difference between $V_{OUT}$ and the input voltage $V_{IN}$ is larger than when the difference is smaller. At the peak of the input voltage $V_{IN}$ where the difference between $V_{OUT}$ and $V_{IN}$ is relatively small, S1 is controlled to be on for a relatively small proportion of each switching period as illustrated in the right hand side of waveform $i_{S1}$.

Substituting the right hand side of equation 7 for $\delta$ in equation 6 yields:

$$I_{C3F} = I_R + i_{L1}\left(2\frac{V_{IN}}{V_{OUT}} - 1\right) \quad \text{(equ. 8)}$$

Equation 8 can be used to determine the relative magnitudes of the voltages and currents in the second term of equation 8 necessary to result in a positive value of $i_{C3F}$ when switch S1 turns on at time $t_6$. Current $i_{L1}$ and voltage $V_{IN}$ in equation 8 are both sinusoidal signals which vary at the power line frequency.

To ensure that there is not a voltage across switch S1 when switch S1 is turned on (commonly referred to as "zero voltage switching"), the magnitude of the diode recovery current $i_R$ must be great enough to overcome any negative current component due to the second term on the right side of equation 8 and must be great enough to charge capacitor C3 with energy equal to or greater than the energy in capacitance C2 at the time of switching. Therefore:

$$\frac{1}{2} L2 (i_{C3F})^2 \geq \frac{1}{2} C2(V_{OUT})^2 \quad \text{(equ. 9)}$$

$$i_{C3FMIN} = V_{OUT}\sqrt{\frac{C2}{L2}} \quad \text{(equ. 10)}$$

If the current $i_{C3F}$ is equal to $i_{C3FMIN}$, then the discharge of capacitance C2 will just be completed when switch S1 is turned on. If, on the other hand, the current $i_{C3F}$ is greater than $i_{C3FMIN}$, and if switch S1 is a field effect transistor, then C2 will be discharged early and the body diode inherently present in switch S1 will prevent the excess current from causing a large reverse voltage from developing across capacitance C2. The excess current will continue to flow in a current loop from node N0, through switch S1, through inductor L2, through diode D5 and into capacitor C1 until the excess energy in inductor L2 is transferred into capacitor C1.

Figure 1:
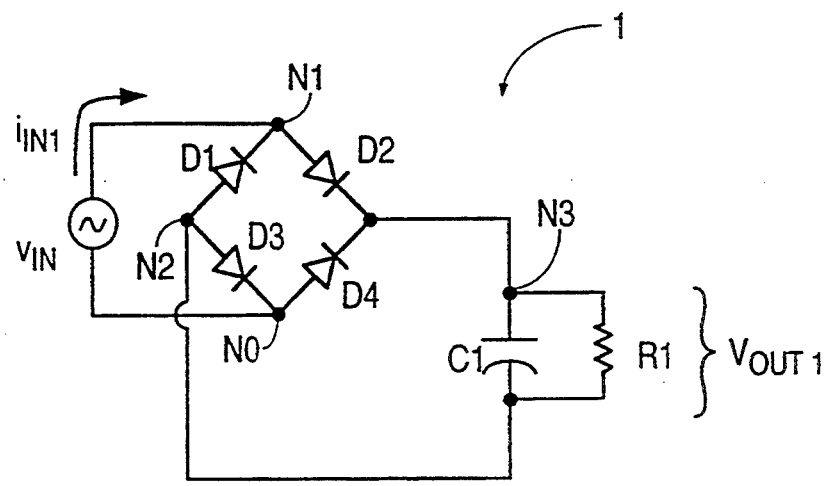
FIG. 1 (PRIOR ART) is a circuit diagram of a conventional power supply circuit.
Figure 2:
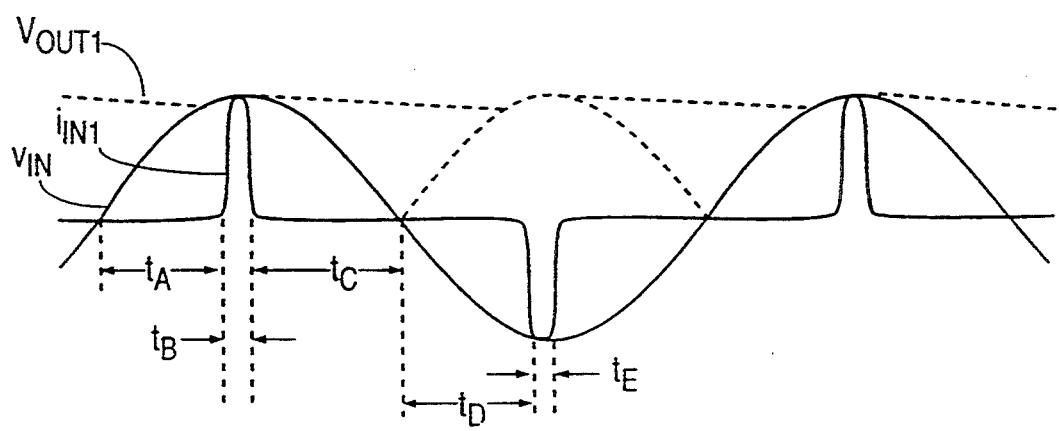
FIG. 2 (PRIOR ART) is a waveform diagram of waveforms associated with an operation of the conventional power supply circuit of FIG. 1.
Figure 3:
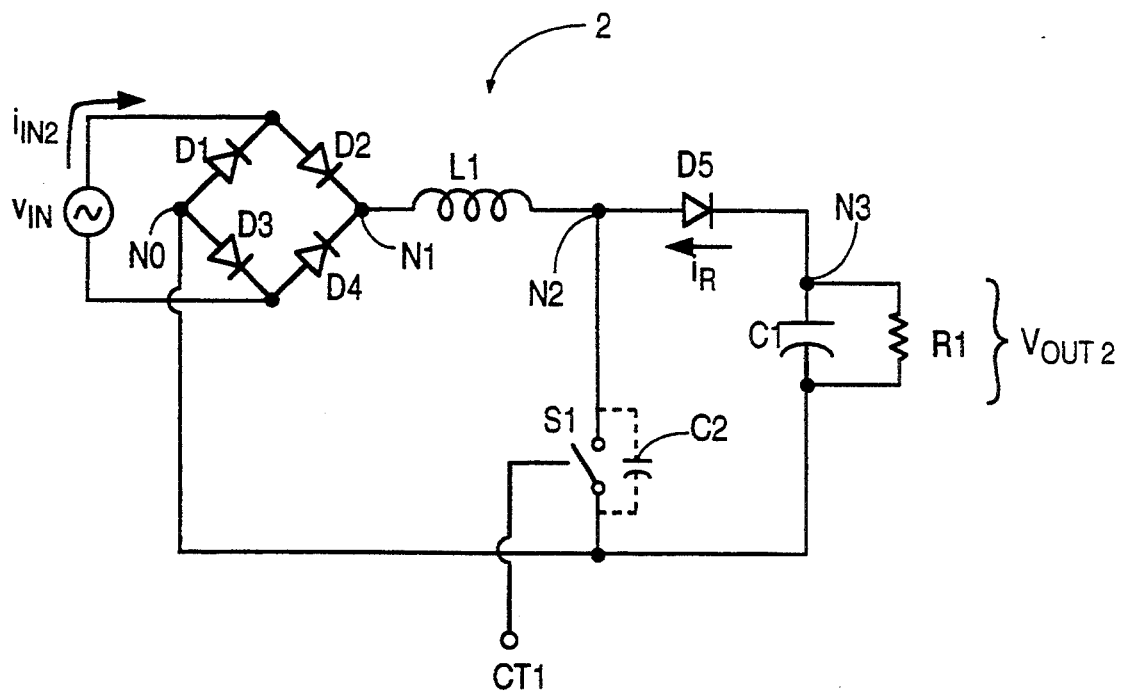
FIG. 3 (PRIOR ART) is a circuit diagram of a conventional boost converter power supply circuit.
Figure 5:
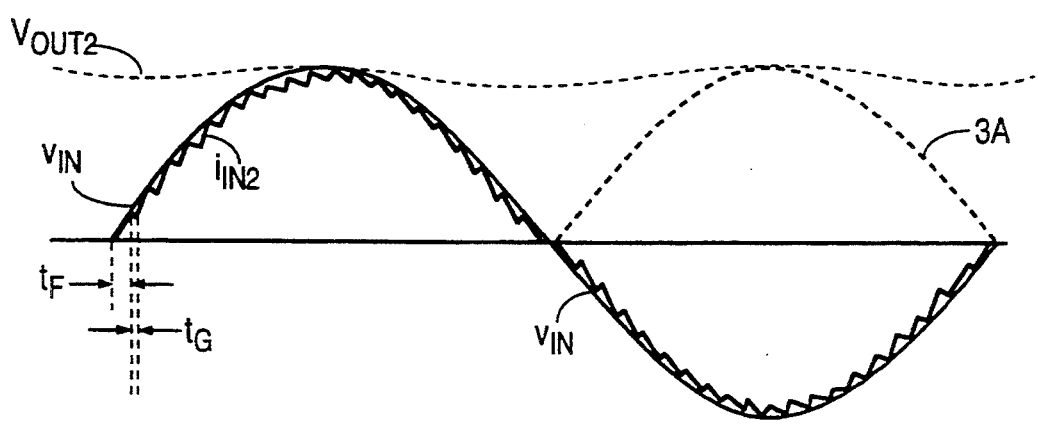
FIG. 5 is a waveform diagram illustrative of waveforms associated with the operation of the circuit of FIG. 4.

In accordance with some embodiments of the present invention, a field effect transistor switched at high frequencies is used for switch S1 with improved efficiency. A typical field effect transistor usable for switch S1 in the conventional circuit of FIG. 3 may, for example, have an intrinsic capacitance of 1000 pF. Although it may seem that the effect of this small capacitance would be negligible, a significant voltage may be present across this capacitance immediately prior to switching switch S1 on due to the relatively large voltage previously placed on node N2 by inductance L1 when switch S1 is switched off. A typical value of the voltage on the output capacitor C1 may be 400 volts DC for a nominal 240 volt AC input voltage. A typical average value for the voltage across capacitance C2 may, for example, be 400 volts. The energy stored in capacitance C2 given by the equation $\frac{1}{2}CV^2$ is 0.08 mJ. Because this amount of energy is lost each time switch S1 is switched on in the conventional circuit of FIG. 3, the switching frequency of a conventional circuit may have to be compromised in order to achieve a desired efficiency of the power supply. In accordance with an embodiment of the present invention, on the other hand, the energy in capacitance C2 is not dissipated in switch S1 but rather is transferred to output capacitor C1. This allows switch S1 to be switched at a high frequency, thereby allowing smaller energy storage components to be used. The present invention is therefore usable to reduce the weight, reduce the size, reduce the cost and/or improve the efficiency of a power supply.

Although specific control signals are illustrated in FIG. 7B in connection with the description of an operation of a specific embodiment illustrated in FIG. 6, other control signals may be used. Switch S2 may, for example, be turned on at any time after switch S1 is turned on but before current $i_{L2}$ next becomes positive. Switch S1 should be turned on when the voltage across capacitance C2 is substantially zero. Switch S1 can be turned off at any time in the cycle which will result in an adequate positive current $i_{L2}$ flowing to discharge capacitance C2 prior to switch S1 being turned on again. Numerous types of control circuits may be used to generate the signals controlling switches S1 and S2. If a FET switch S2 can be obtained having an antiparallel diode which turns off adequately fast, then diode D7 can be omitted. Diode D7 can also be disposed between switch S2 and node N5 rather than between switch S2 and node N4 as depicted.

In accordance with some embodiments of the present invention, an additional diode, the anode of which is connected to node N5 and the cathode of which is connected to node N3, is provided in order to decrease losses in the boost converter. During times $t_3$ and $t_4$, current flows serially through both diodes D6 and D5 resulting in losses associated with a voltage drop of two forward biased diodes. Adding the additional diode provides a single diode forward voltage drop current path for the current which would otherwise have flowed through two diodes, thereby reducing losses.

CONTROL CIRCUIT

In order to control a continuous boost converter power supply to have a power factor close to unity, a control signal is needed that will drive the gate of main switch S1 with a duty cycle $\delta$:

$$\delta = \frac{(V_{OUT} - V_{IN})}{V_{OUT}} \qquad \text{(equ. 11)}$$

$V_{OUT}$ is the voltage output by the boost converter power supply and is constant or varies only slowly. $V_{IN}$ is the voltage supplied to the boost converter power supply which typically varies at the rectified line frequency (e.g. 120 Hz).

Consider a pulse width modulator circuit (see FIG. 9) having a linear ramp voltage signal of frequency $f_s$ ($f_s$ is the switching frequency of switch S1) supplied to one input terminal of an amplifier 13 by a resistor divider 14, 15. FIG. 10 shows time T1 which occurs ($\tau$ is the switching period of switch S1) when the ramp voltage exceeds a DC voltage level present on the other input terminal of the amplifier 13. The peak voltage of the ramp signal is labelled "a" and the magnitude of the DC voltage is labeled "b". The slope of the ramp, m, is:

$$m = \tau/a \qquad \text{(equ. 12)}$$

$$T1 = m/b = a/b\tau \qquad \text{(equ. 13)}$$

From FIG. 10 it is apparent that $c = a - b$, therefore:

$$\frac{T1}{\tau} = \delta = \frac{(a - c)}{a} \qquad \text{(equ. 14)}$$

From equations 11 and 14 it is seen that this pulse width modulator circuit produces a signal having an appropriate duty cycle to control a unity power factor boost converter provided:

$$a \propto V_{OUT} \qquad \text{(equ. 15)}$$

and $$c \propto V_{IN} \qquad \text{(equ. 16)}$$

Furthermore, unity power factor is achieved if the input current varies in proportion to the input voltage and has the same phase. Therefore:

$$V_{IN} = R_{IN} i_{IN} \qquad \text{(equ. 17)}$$

The converter therefore should appear as a "resistor" to the input line where the resistance is essentially constant over the period of the input current received from the input line. From equations 11 and 17:

$$\delta = \frac{V_{OUT} - R_{IN} i_{IN}}{V_{OUT}} = \frac{V_{OUT}/R_{IN} - i_{IN}}{V_{OUT}/R_{IN}} \qquad \text{(eq. 18)}$$

Therefore, from equations 14 and 18 it is seen that the pulse width modulator circuit will produce an appropriate control signal of duty cycle $\delta$ to control a power factor correcting boost converter if:

$$a \propto V_{OUT}/R_{IN} = k_1 V_{OUT}/R_{IN} \qquad \text{(equ. 19)}$$

(slowly varying)

and $c \propto i_{IN} = k_2 i_{IN}$ (varies more $\qquad \text{(equ. 20)}$ rapidly with $V_{IN}$)

Figure 9:
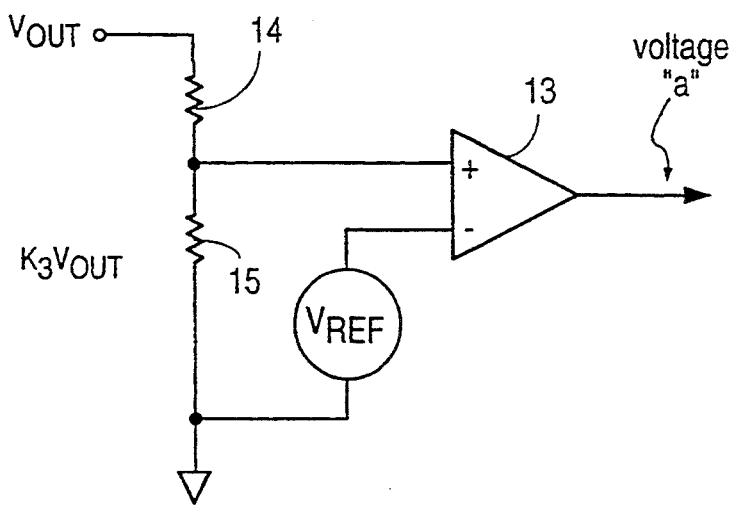
FIG. 9 is a simplified circuit diagram of a circuit generating a voltage "a".
Figure 10:
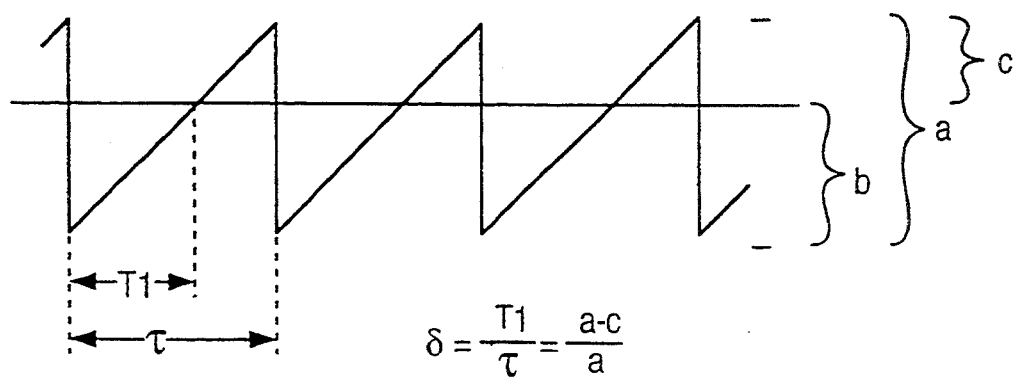
FIG. 10 is a waveform diagram illustrative of an operation of a pulse width modulator circuit in accordance with an embodiment of the present invention.

FIG. 9 therefore shows a circuit usable to detect the power supply output voltage $V_{OUT}$ so that a sample of the output voltage is compared to a constant reference voltage $V_{REF}$ and the difference is amplified. Such an amplified difference signal can be used to generate a voltage of magnitude "a".

Therefore:

$$(k_3 V_{OUT} - V_{REF}) G_1 = a = \frac{k_1 V_{OUT}}{R_{IN}} \qquad \text{(equ. 21)}$$

where $k_3$ is set by the voltage divider formed by resistors 14 and 15. $G_1$ is the gain of the amplifier 13 with sufficiently low bandwidth to maintain constant $R_{IN}$. Rearranging terms:

$$V_{OUT}(k_3 G_1 - k_1/R_1) = G_1 V_{REF} \qquad \text{(equ. 22)}$$

If $k_3 G_1 >> k_1/R_{IN}$, which is true if $G_1$ is made adequately large, then:

$$V_{OUT} k_3 G_1 \approx G_1 V_{REF} \qquad \text{(equ. 23)}$$

or $$V_{OUT} = k_3/V_{REF} \qquad \text{(equ. 24)}$$

$V_{OUT}$ is therefore essentially constant as is required for regulation.

Figure 11:
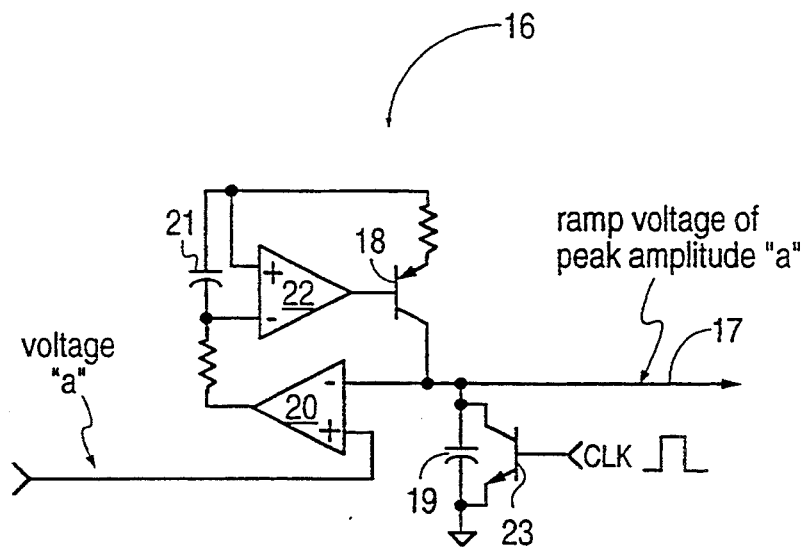
FIG. 11 is a simplified circuit diagram of a ramp generator generating a ramp voltage of peak amplitude "a".

A ramp generator can therefore be constructed to receive two input signals: a voltage signal having a peak amplitude "a" and a clock signal. FIG. 11 shows one such ramp generator 16. In operation, a ramp voltage signal is generated on output terminal 17 by current from transistor 18 charging capacitor 19. When the amplitude of the ramp voltage signal reaches the voltage level "a", the signal output by comparator 20 goes low and adds charge to a capacitor 21, The small voltage on capacitor 21 is amplified and inverted by comparator 22 to drive transistor 18 and to modulate the current charging capacitor 19. By proper selection of the gain of comparator 22, the voltage on capacitor 21 can be made very small. The time that the amplitude of the ramp signal voltage exceeds voltage level "a" can therefore be made negligible. When the voltage on the output terminal 17 reaches the voltage "a" capacitor 19 is rapidly discharged by transistor 23 under control of the clock signal CLK.

Figure 12:
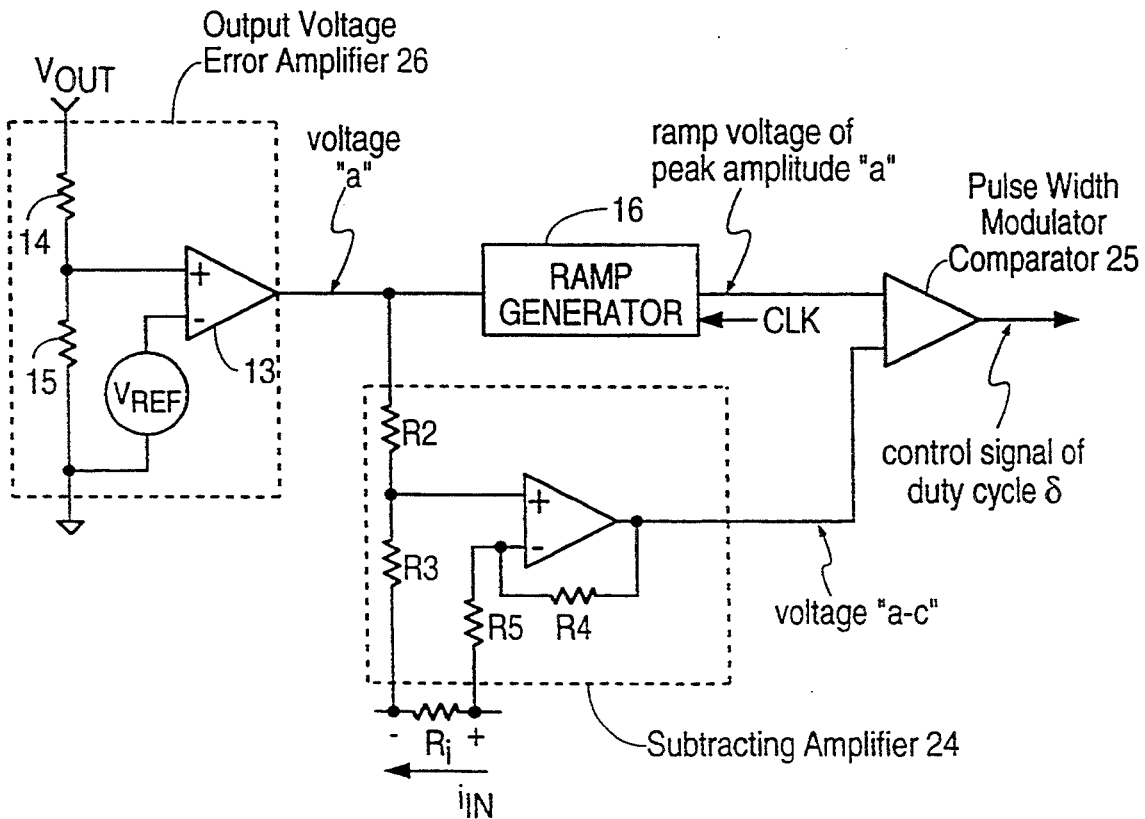
FIG. 12 is a simplified circuit diagram of a control circuit in accordance with an embodiment of the present invention.

From the earlier discussion, voltage "c" (c=$k_2 i_{IN}$; see equation 20), is to be subtracted from voltage "a" to generate a control signal of the desired duty cycle δ(see equation 14). FIG. 12 therefore shows a relatively low gain-high bandwidth subtracting amplifier 24 having a gain $G_2$ and a comparator 25 added to the other circuit elements where:

$$R2/R3 = R4/R5 = G_2 \quad \text{(equ. 25)}$$

$$k_2 = G_2 R_i \quad \text{(equ. 26)}$$

A problem with the control circuit of FIG. 12 and with other such power factor correcting boost converter control circuits is that the output voltage error amplifier 26 which generates voltage "a" is required to have low bandwidth to insure proper operation. If, for example, the frequency of the input voltage $V_{IN}$ is 60 Hz, then output voltage error amplifier 26 should have a low gain at the 120 Hz rectified line frequency so that the control circuit will not attempt to correct for the 120 Hz fluctuations on output capacitor C1. With this low gain at 120 Hz and above, however, the response to sudden load changes on the output of the power supply is slow. Large transient voltage droops and overshoots of voltage $V_{OUT}$ can therefore occur.

In accordance with an embodiment of the present invention, an improvement is made to the control circuit of FIG. 12. For unity power factor:

$$R_{IN}/V_{INRMS})^2 = R_{OUT}/(V_{OUT})^2 \quad \text{(equ. 27)}$$

Combining equation 27 with equation 19:

$$a = k_1 V_{OUT}/R_{OUT}\left(\frac{V_{OUT}}{V_{INRMS}}\right)^2 \quad \text{(equ. 28)}$$

By definition: $V_{OUT} R_{OUT} = I_{OUT}$ (equ. 29)

$$\text{Therefore: } a = k_1 I_{OUT}\left(\frac{V_{OUT}}{V_{INRMS}}\right)^2 \quad \text{(equ. 30)}$$

Figure 13:
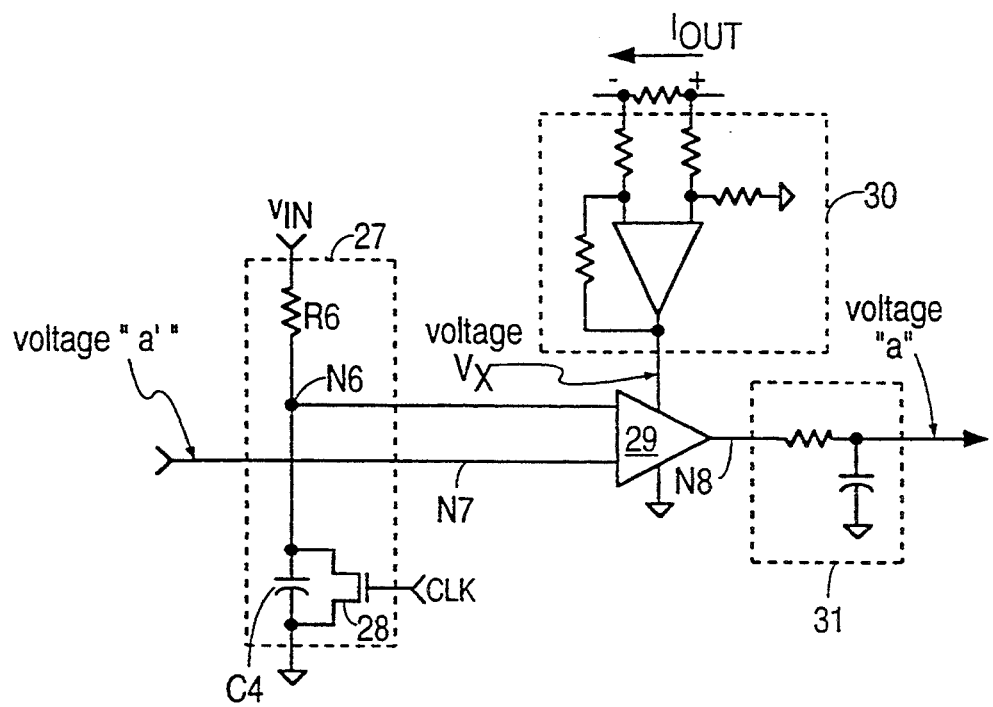
FIG. 13 is a simplified circuit diagram of a second circuit generating a voltage "a" in accordance with an embodiment of the present invention.

FIG. 13 is a simplified diagram showing a second pulse width modulator circuit 27. A ramp voltage $V_{RAMP}$ is generated onto node N6 by applying an average value of $V_{IN}$ ($V_{INRMS}$) to an RC circuit 31 comprising resistor R6 and capacitor C4. Capacitor C4 is periodically rapidly discharged by transistor 28 in response to a clock signal CLK of period τ. If $V_{INRMS} >> V_{RAMP}$, then the ramp voltage signal $V_{RAMP}$ is essentially linear and has a slope n:

$$n = \frac{V_{INRMS}}{(R6)(C4)} = k_1 \frac{V_{INRMS}}{\tau} \quad \text{(equ. 31)}$$

A voltage level "a'" is assumed to be present on node N7. When voltage level "a'" is compared to ramp voltage signal $V_{RAMP}$ by a comparator 29, a signal on the output terminal of comparator 29 has a duty cycle θ of:

$$\theta = \frac{a'}{k_2 V_{INRMS}} \quad \text{(equ. 32)}$$

Figure 14:
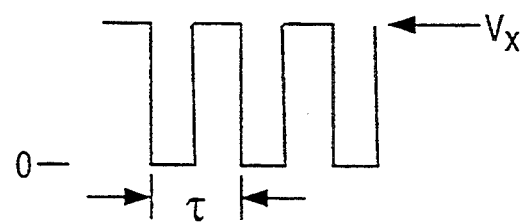
FIG. 14 is a waveform diagram illustrative of a signal present on the output lead of comparator 29 of FIG. 13.

The duty cycle θ is therefore proportional to the magnitude of voltage level "a'" and is inversely proportional to voltage $V_{INRMS}$. If comparator 29 is used to modulate a voltage $V_x$, obtained by amplifying a sample of the output current $I_{OUT}$ of the boost converter by a constant $k_3$, then a signal is present on the output lead of comparator 29 at node N8, as is illustrated in FIG. 14. The average value of the signal on node N8 is:

$$a = \theta V_x = \theta k_3 I_{OUT} \quad \text{(equ. 33)}$$

Where:

$$k_3 = G_0 R_{OUT} \quad \text{(equ. 34)}$$

Block 30 in FIG. 13 is a simplified circuit diagram of a circuit for generating voltage $V_x$ from output current $I_{OUT}$. Block 31, in this case an RC filter, is a simplified representation of a circuit which outputs an average voltage of the voltage signal on node N8.

Combining equations 32 and 33:

$$a = \frac{a' k_3 I_{OUT}}{k_2 V_{INRMS}} = k_1 \left(\frac{V_{OUT}}{V_{IMRMS}}\right)^2 \quad \text{(equ. 36)}$$

Eliminating like terms:

$$a' = k_4 V_{OUT}(V_{OUT}/V_{INRMS}) \quad \text{(equ. 36)}$$

where $k_4 = k_1 k_2 / k_3$

Figure 15:
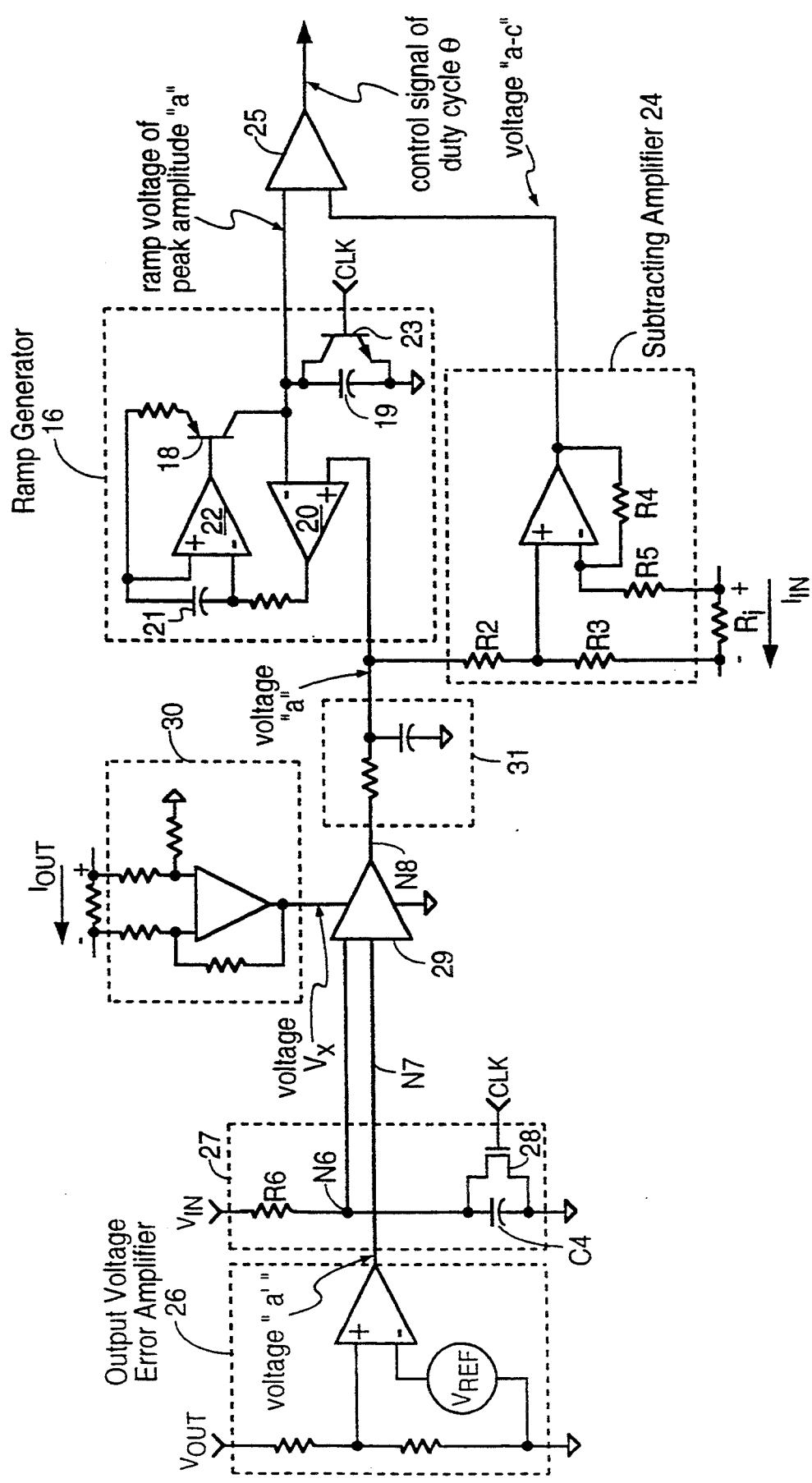
FIG. 15 is a simplified circuit diagram of a control circuit in accordance with another embodiment of the present invention.
Figure 16A:
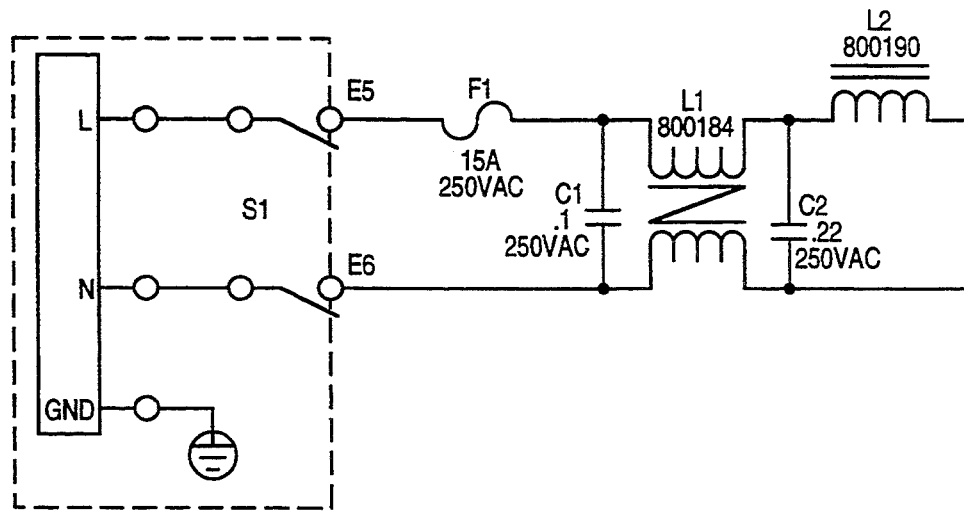
Figure 16A:
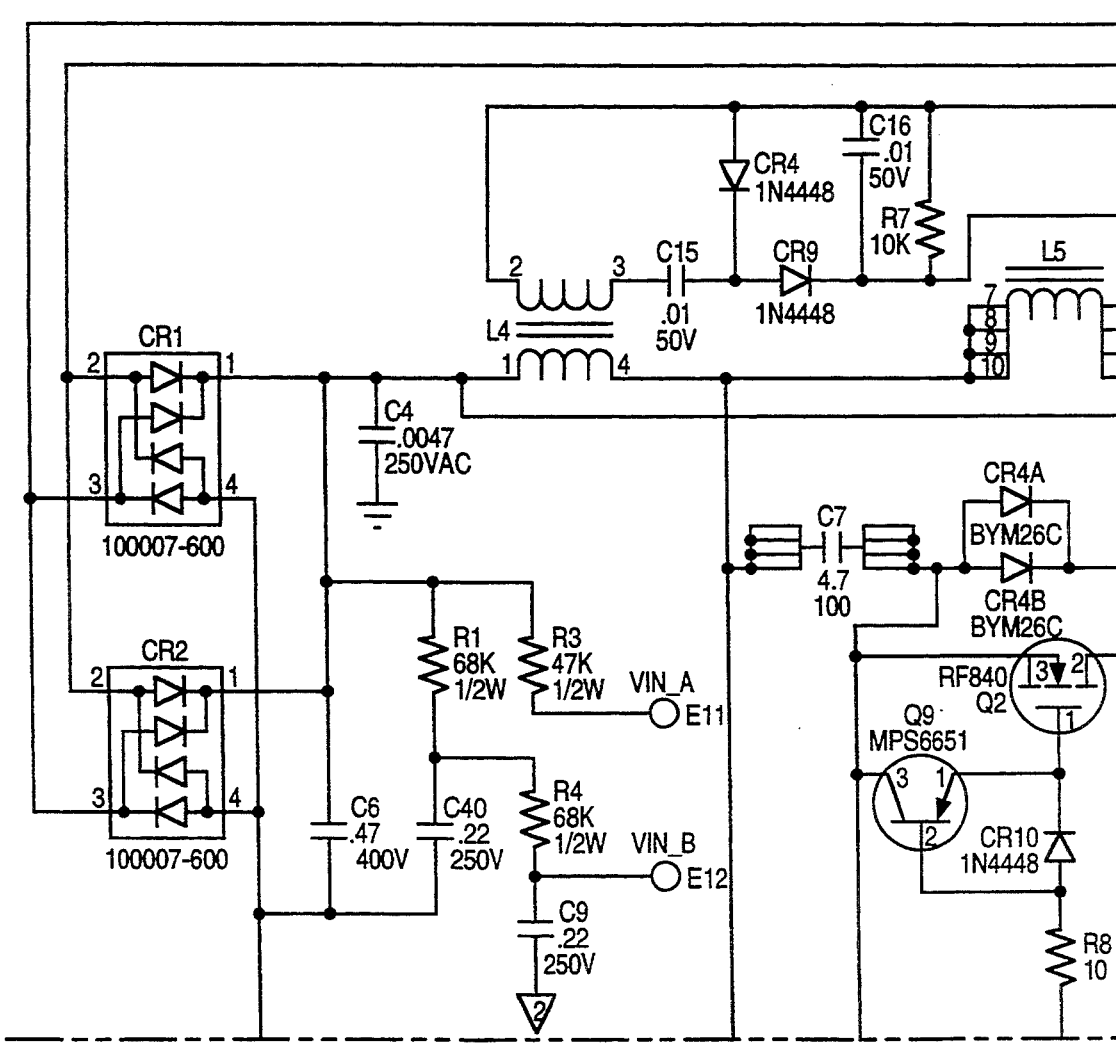
Figure 16B:
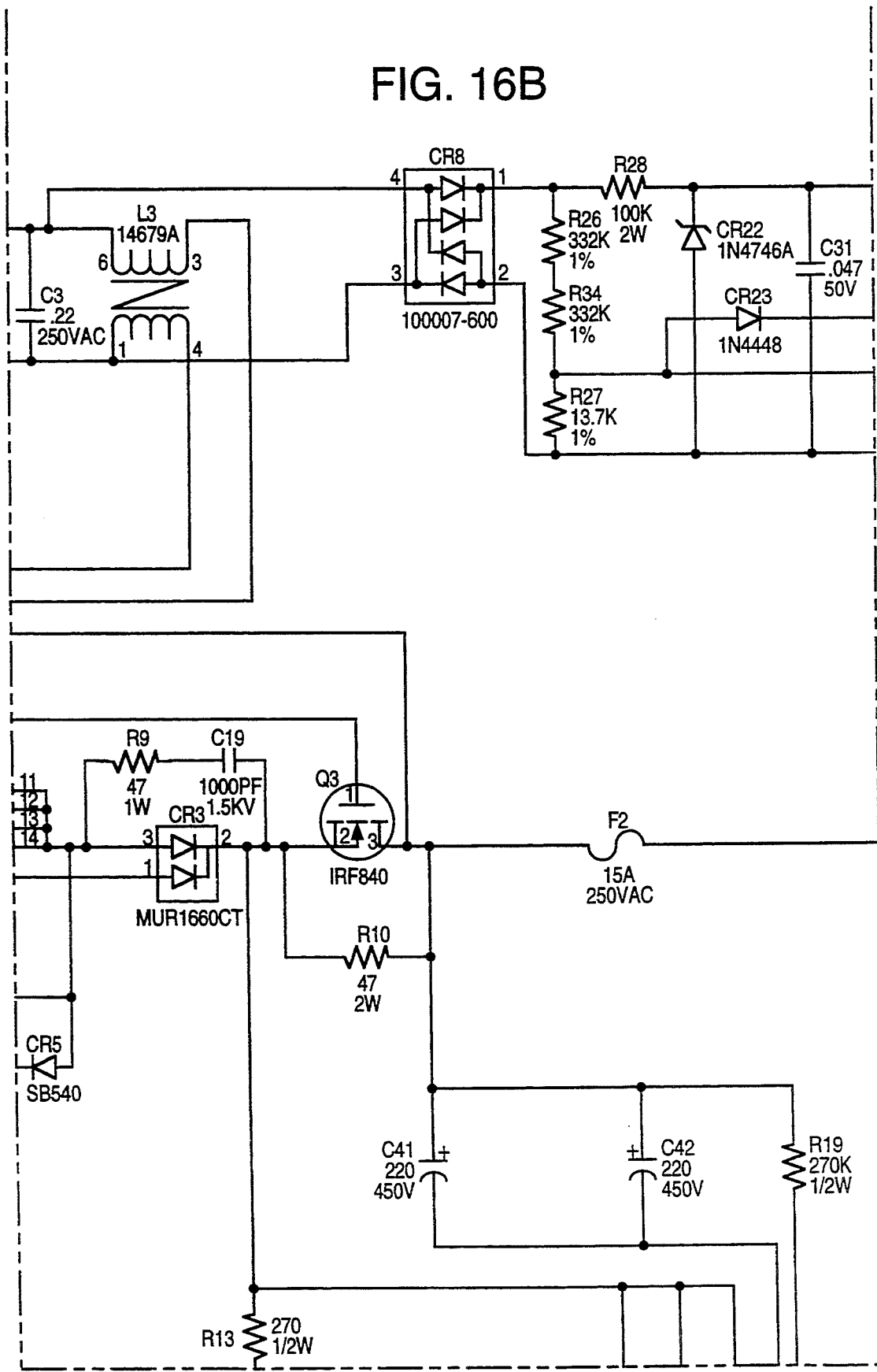
Figure 16C:
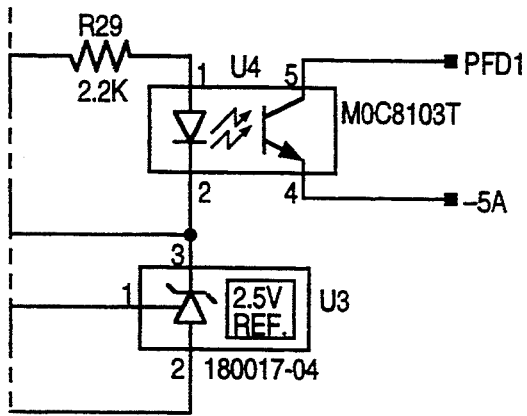
Figure 16C:
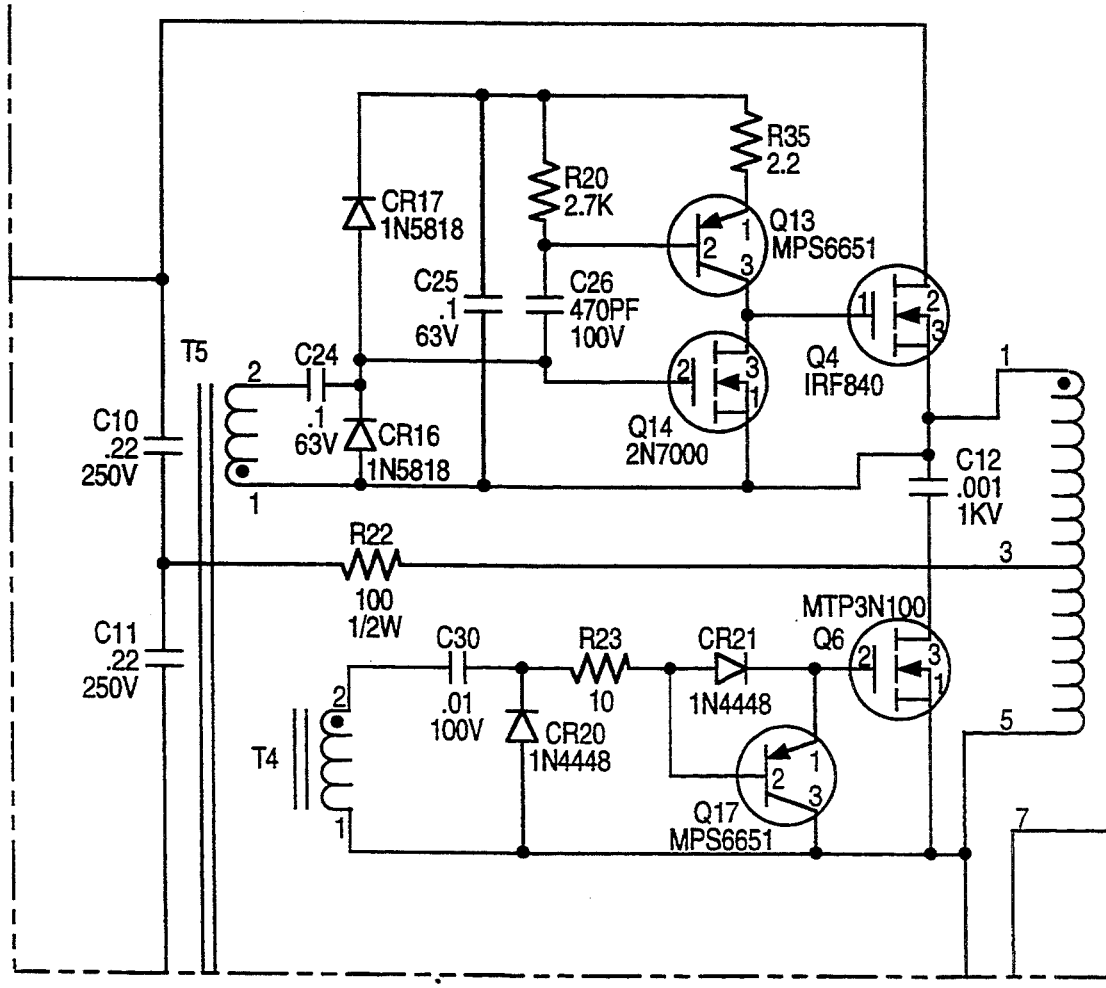
Figure 16D:
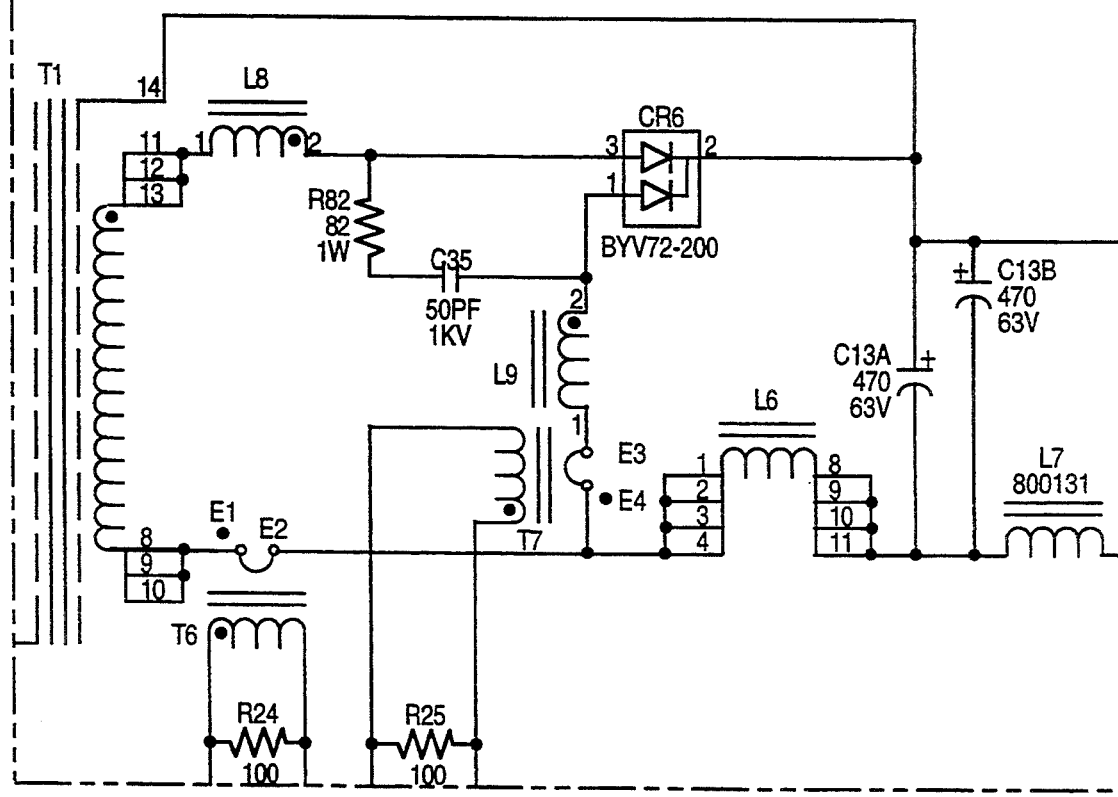
Figure 16E:
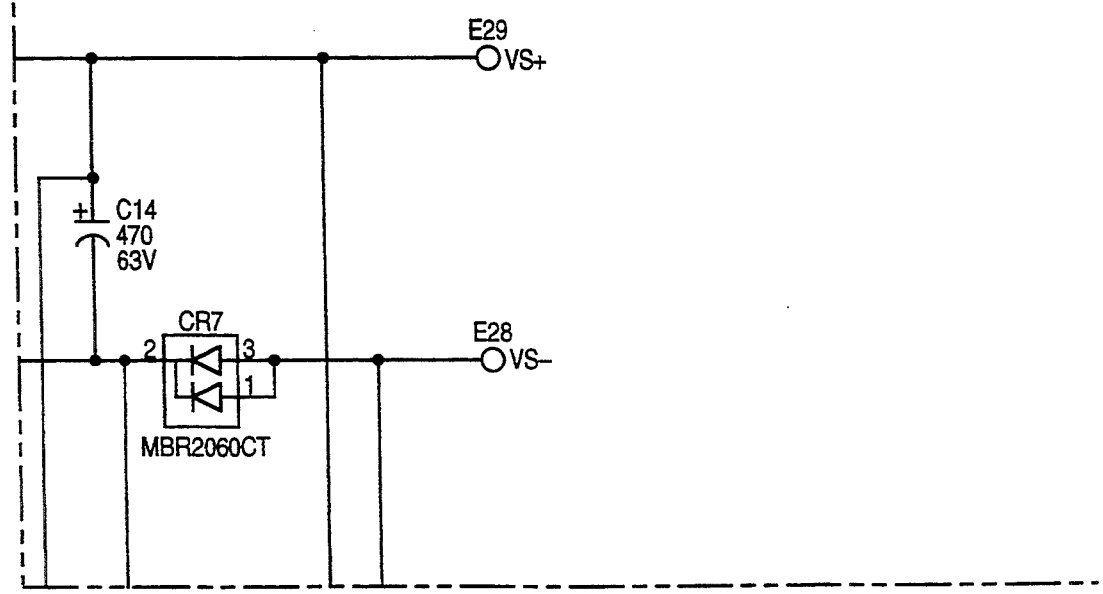
Figure 16F:
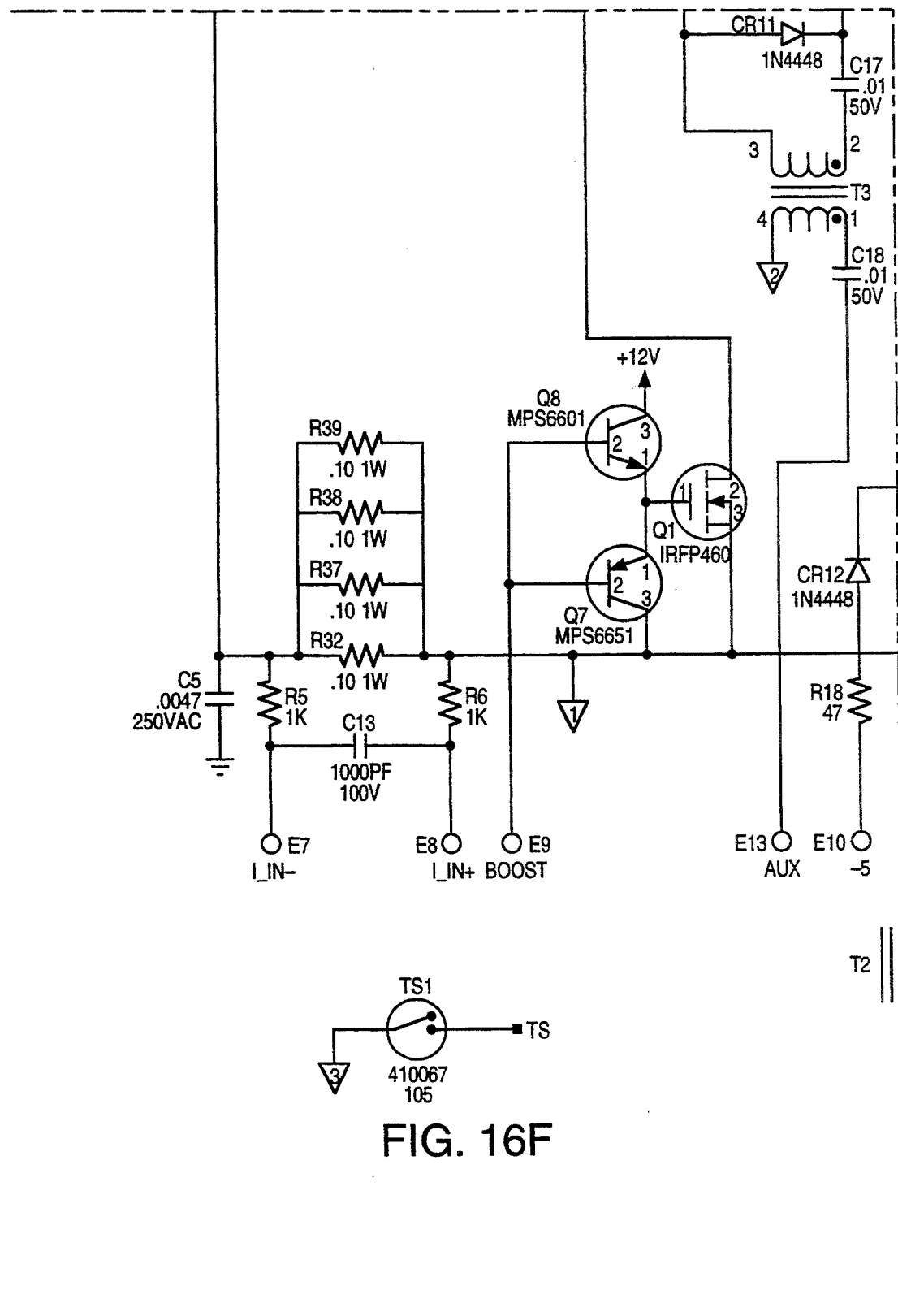
Figure 16G:
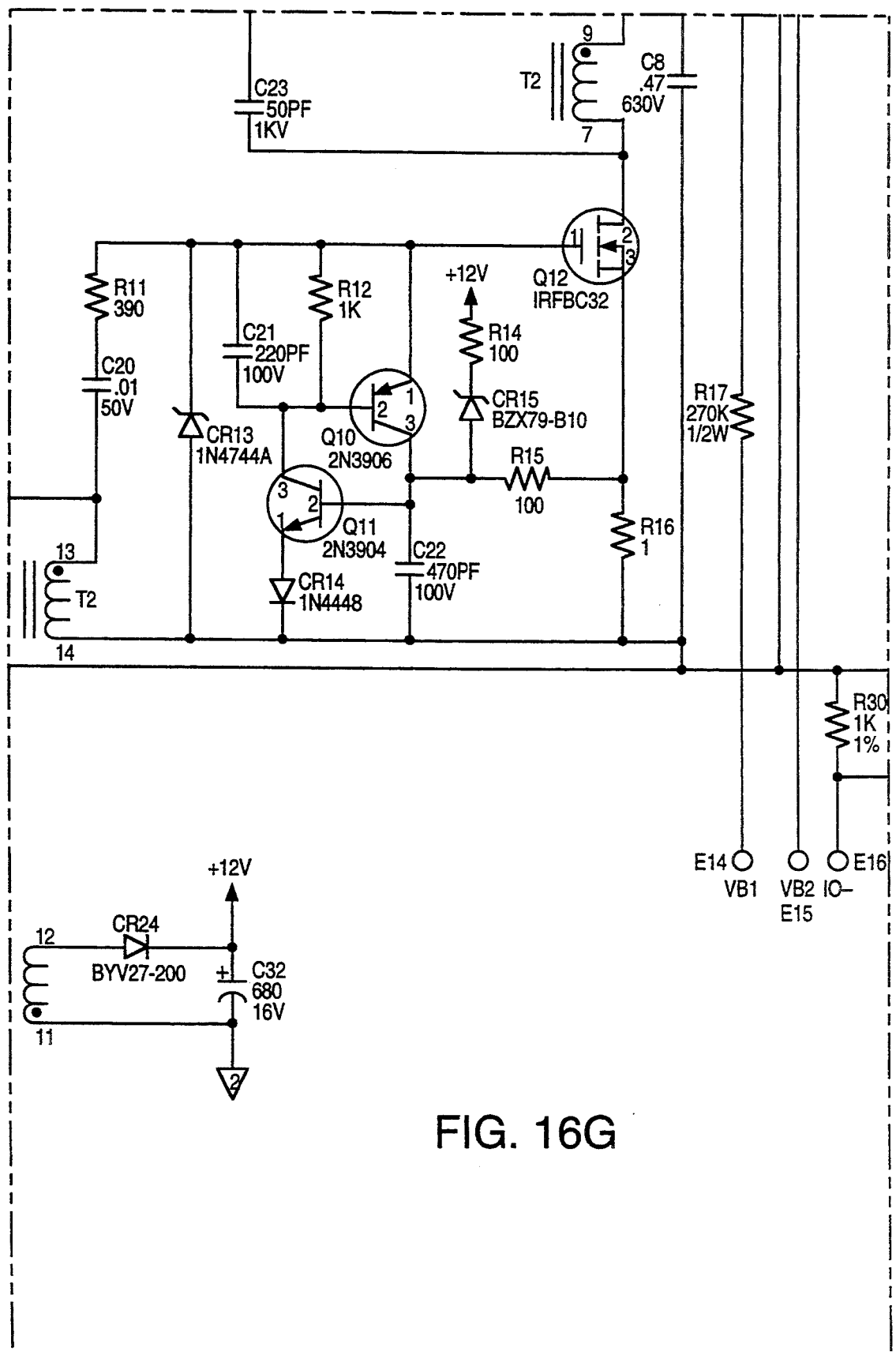
Figure 16H:
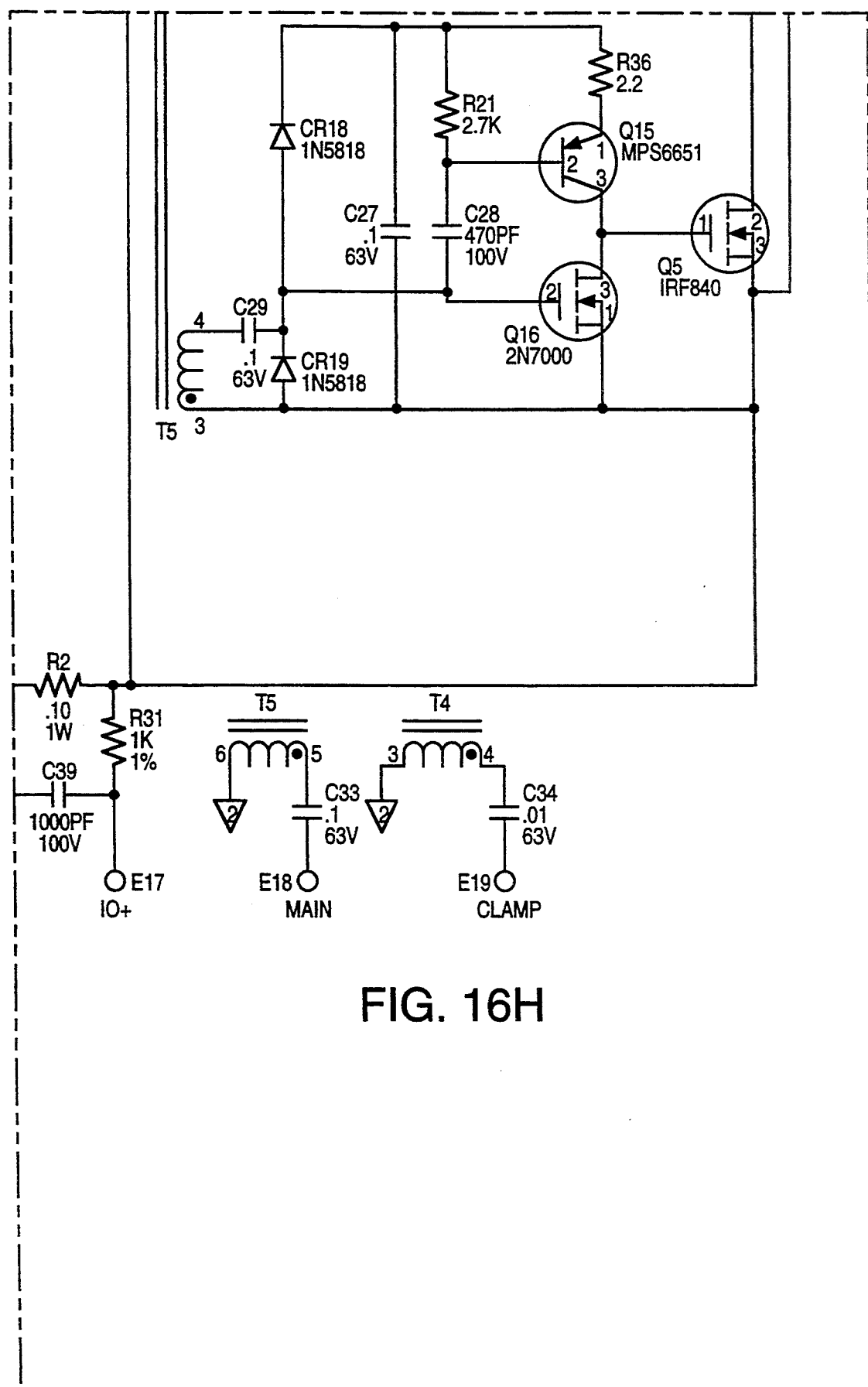
Figure 16I:
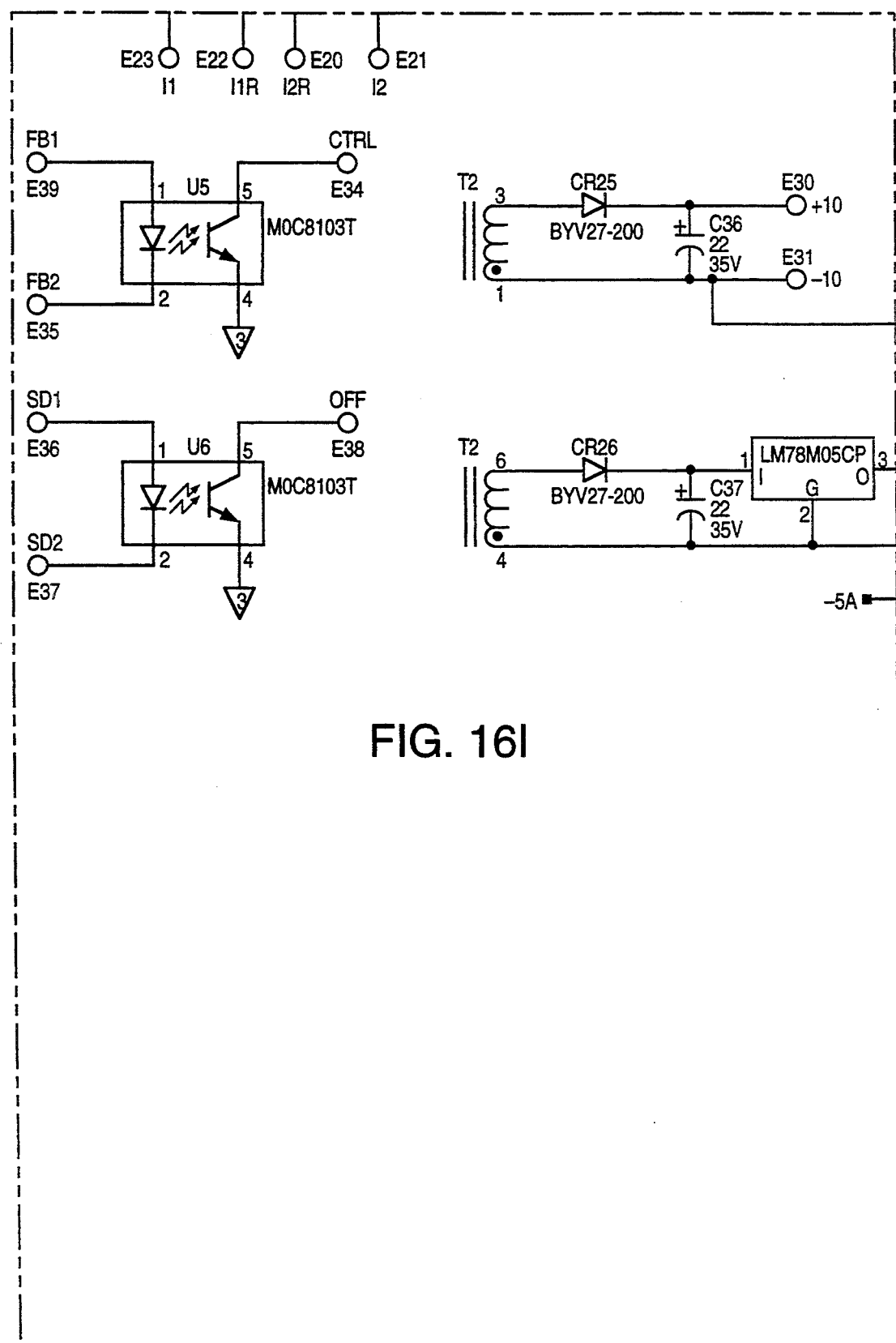
Figure 17A:
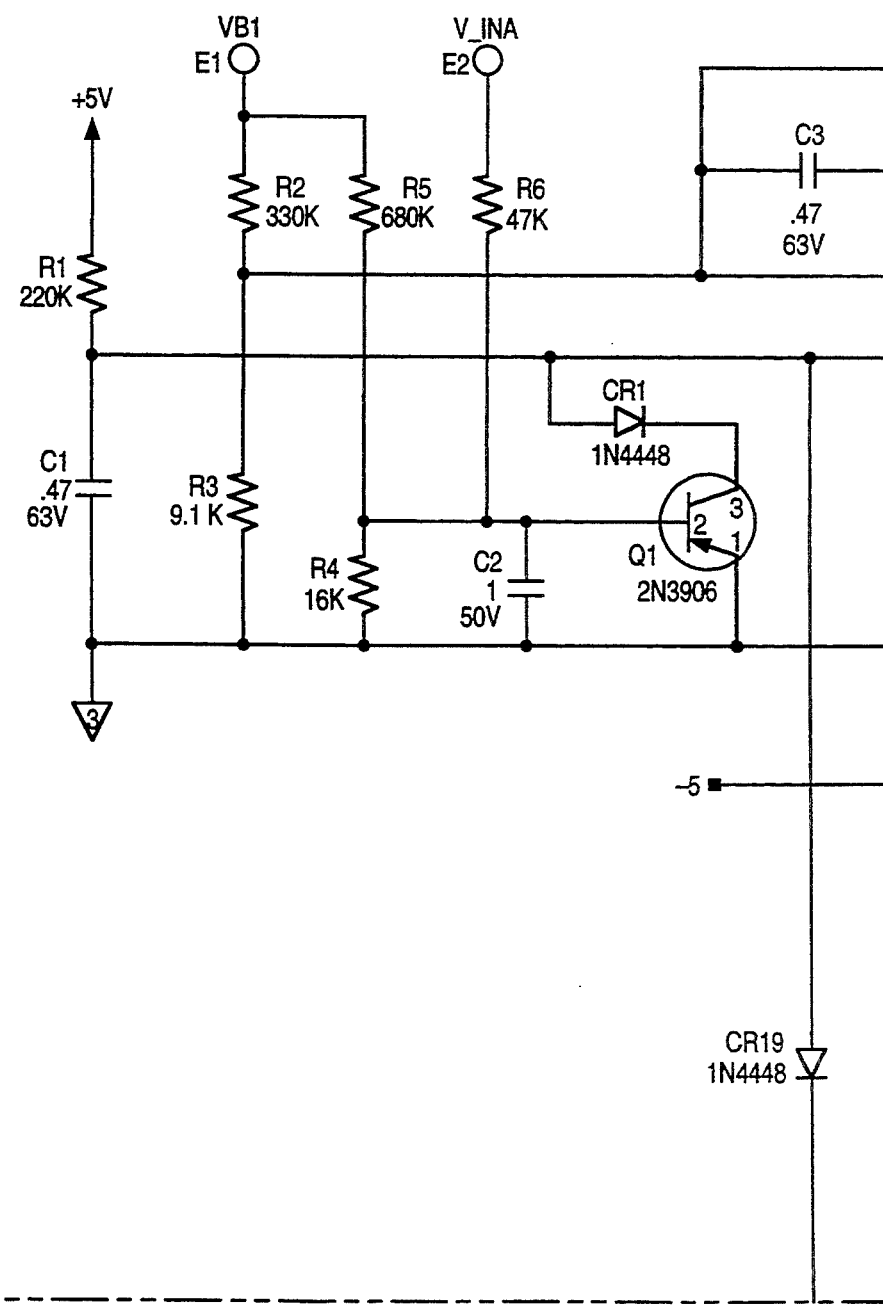
FIGS. 17A–17J are detailed circuit diagrams of a power factor correcting boost converter control circuit in accordance with an embodiment of the present invention.
Figure 17B:
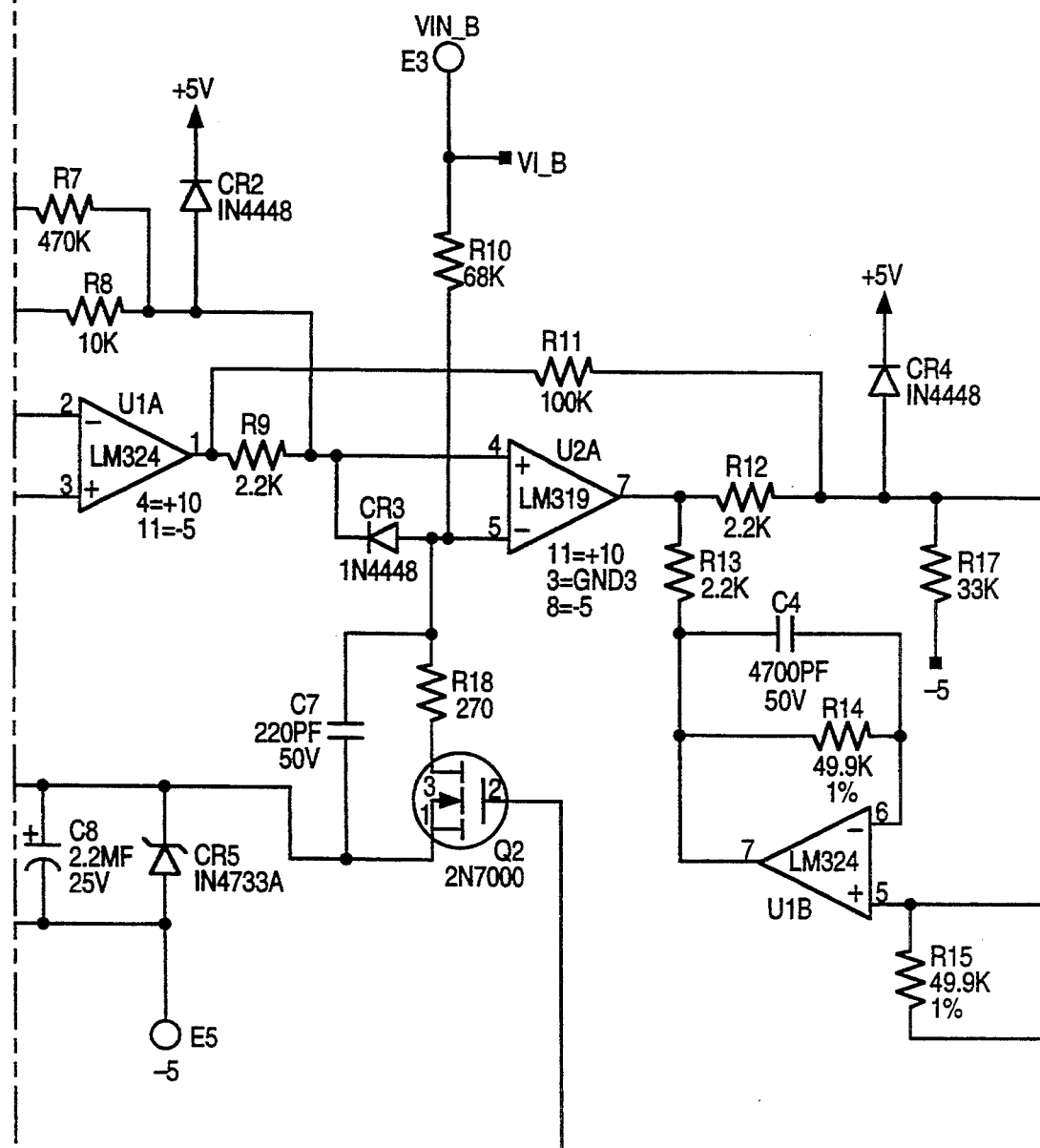
Figure 17C:
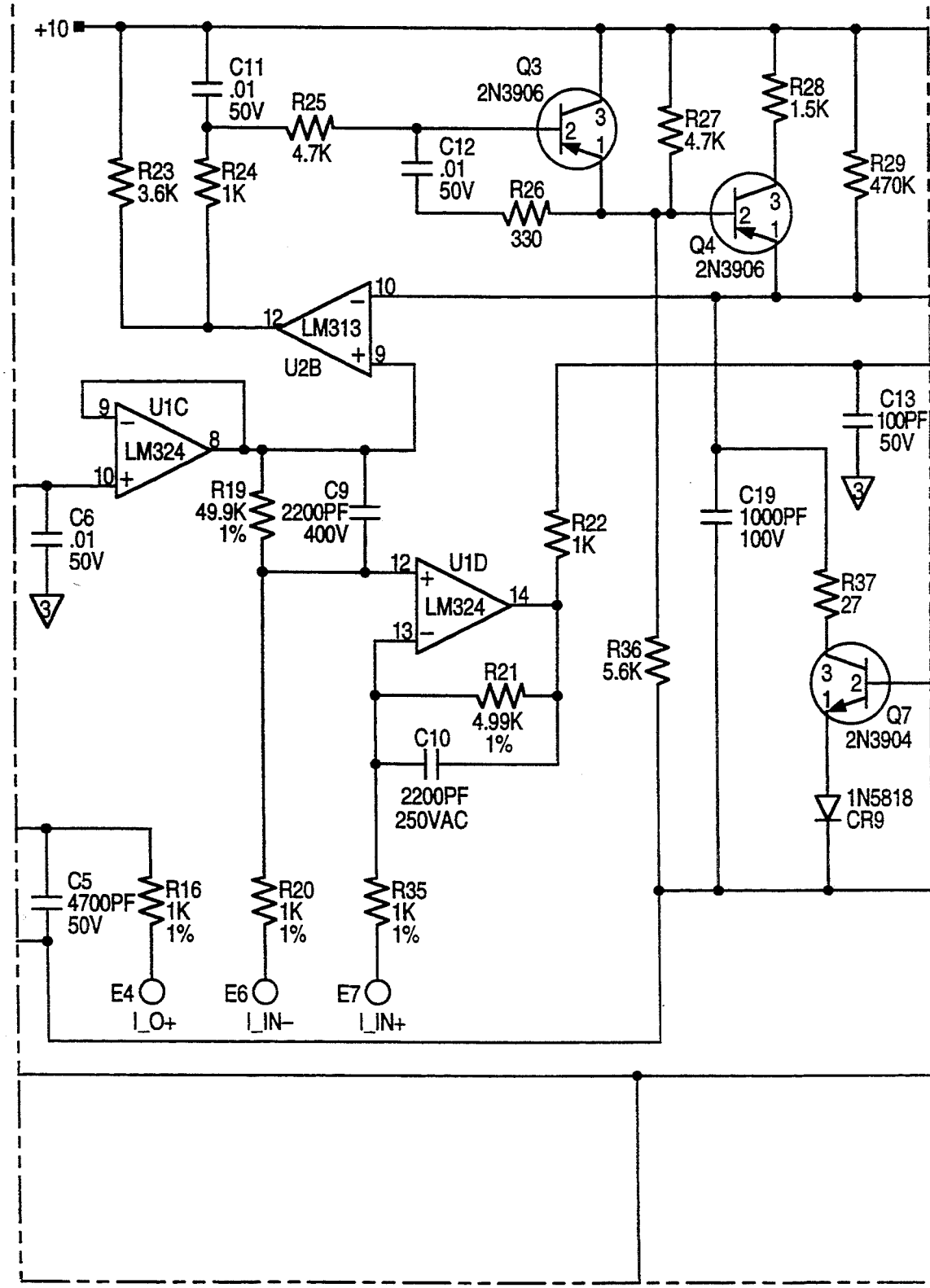
Figure 17D:
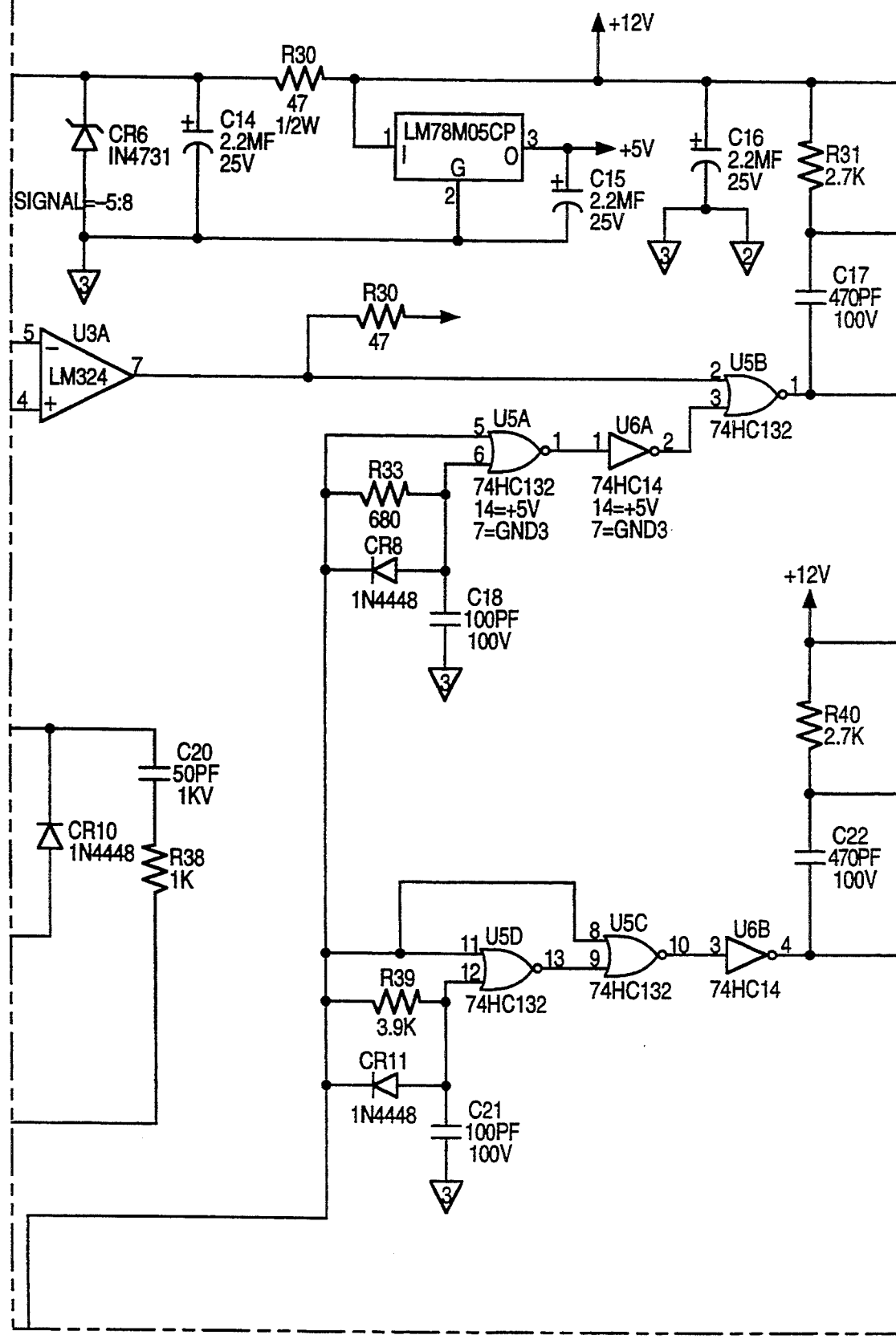
Figure 17E:
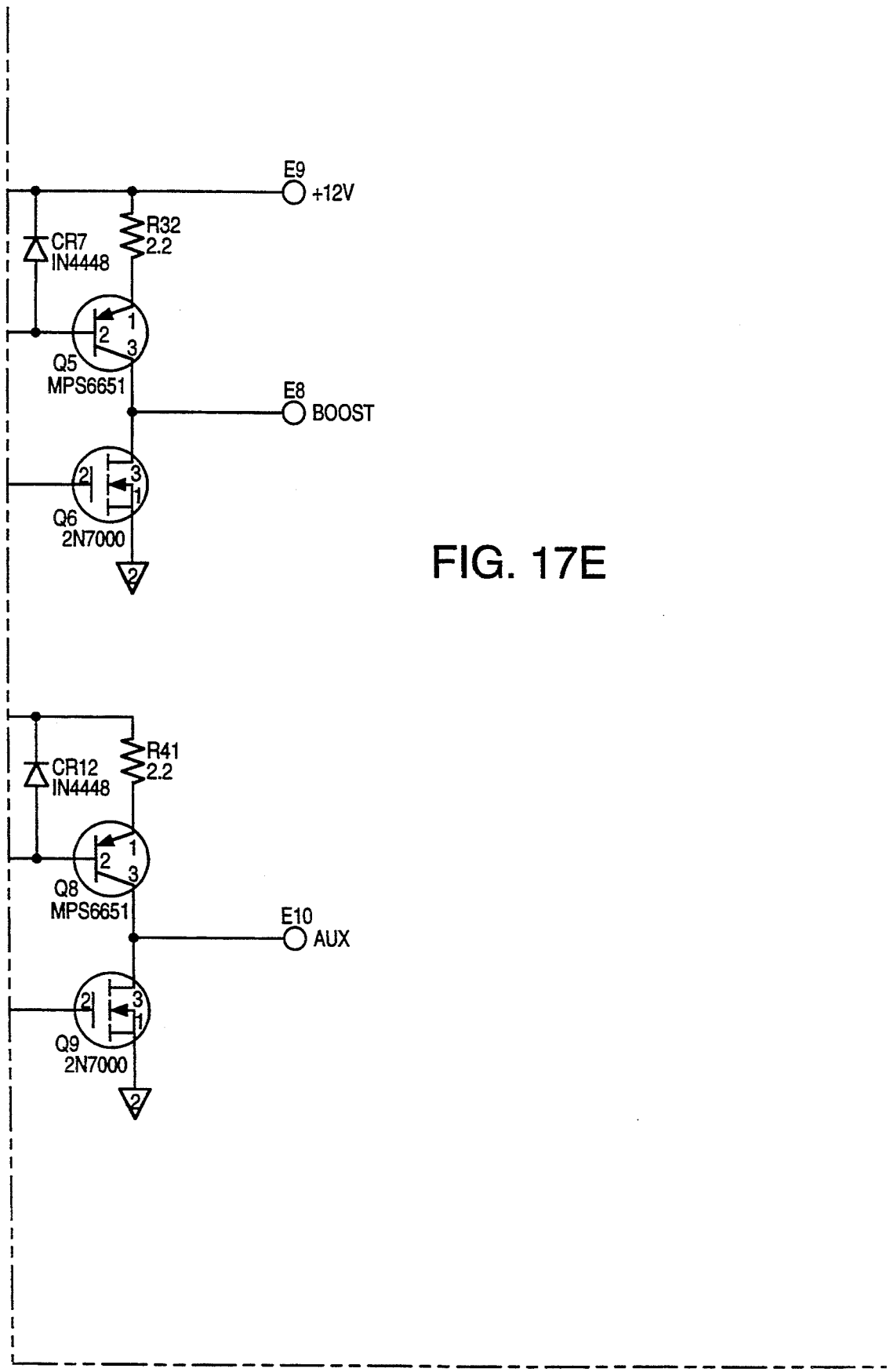
Figure 17F:
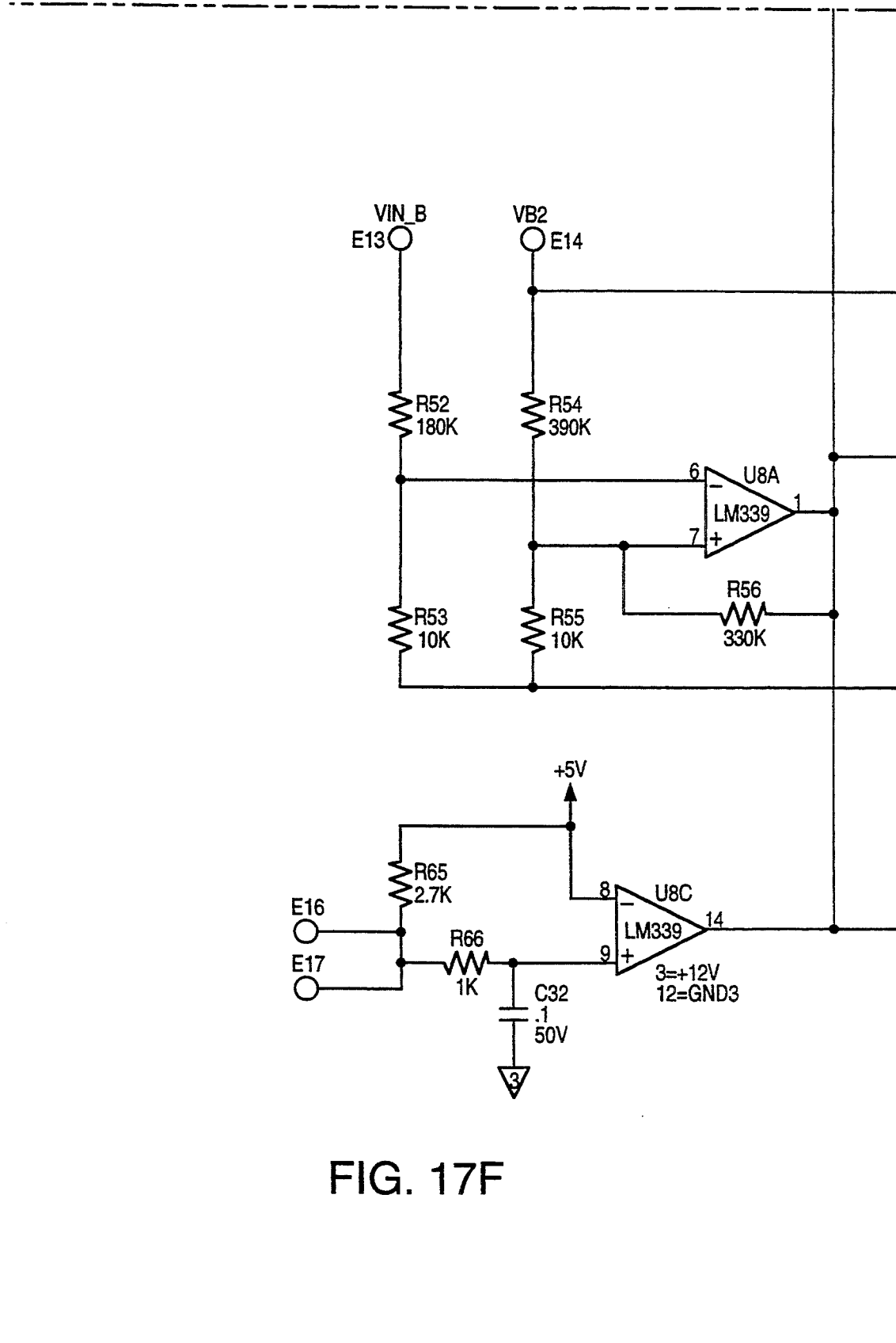
Figure 17G:
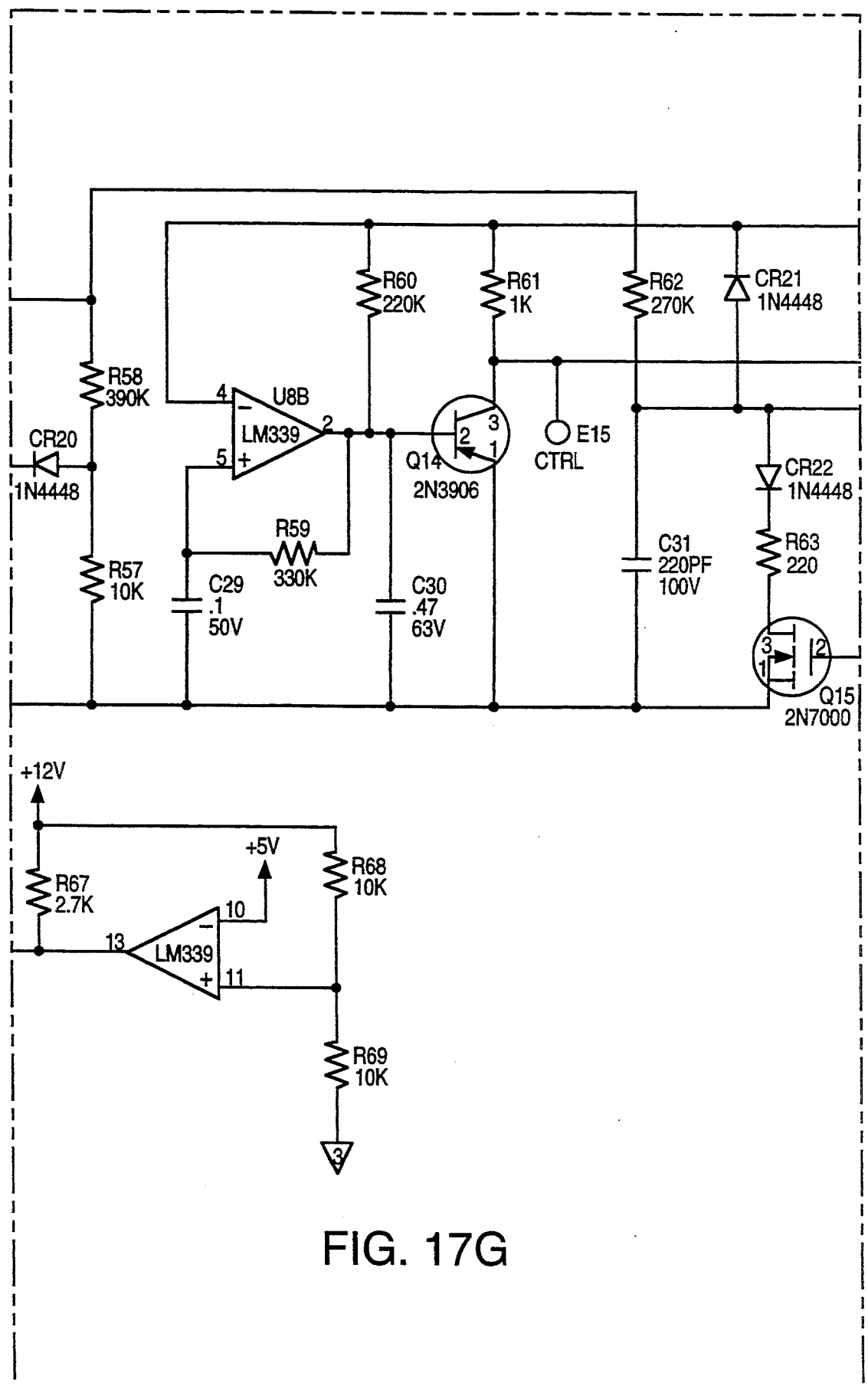
Figure 17H:
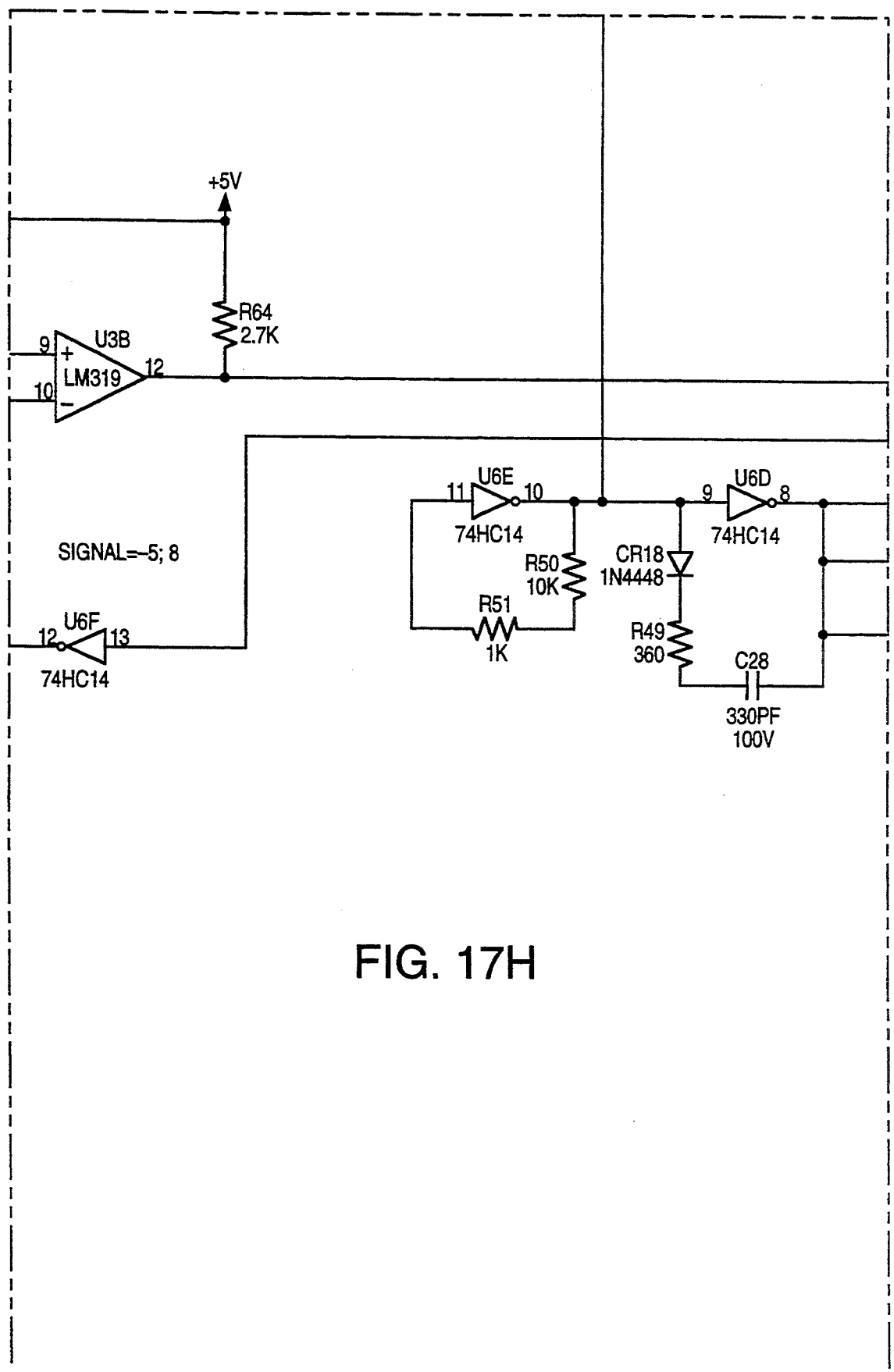
Figure 17I:
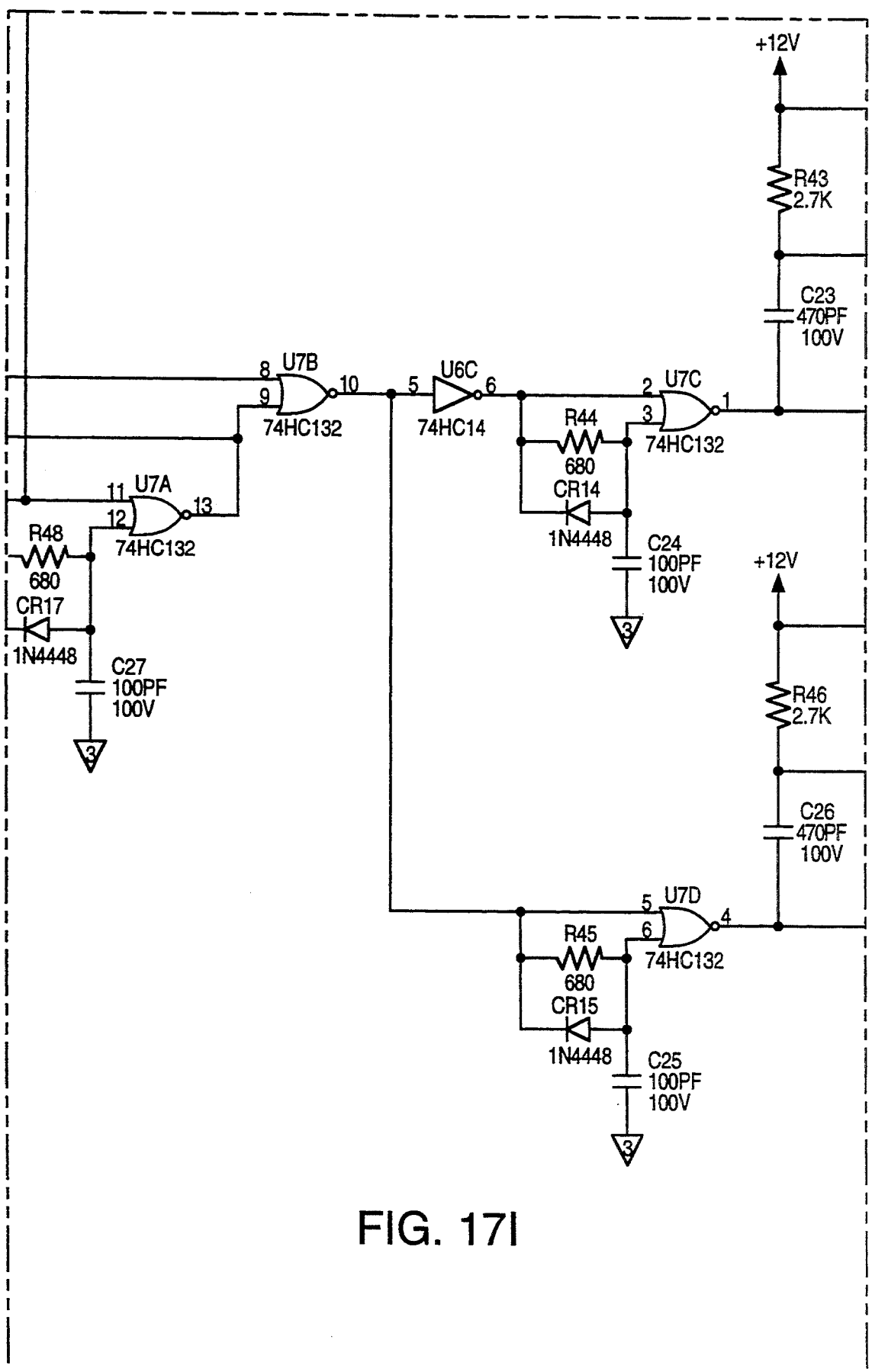
Figure 17J:
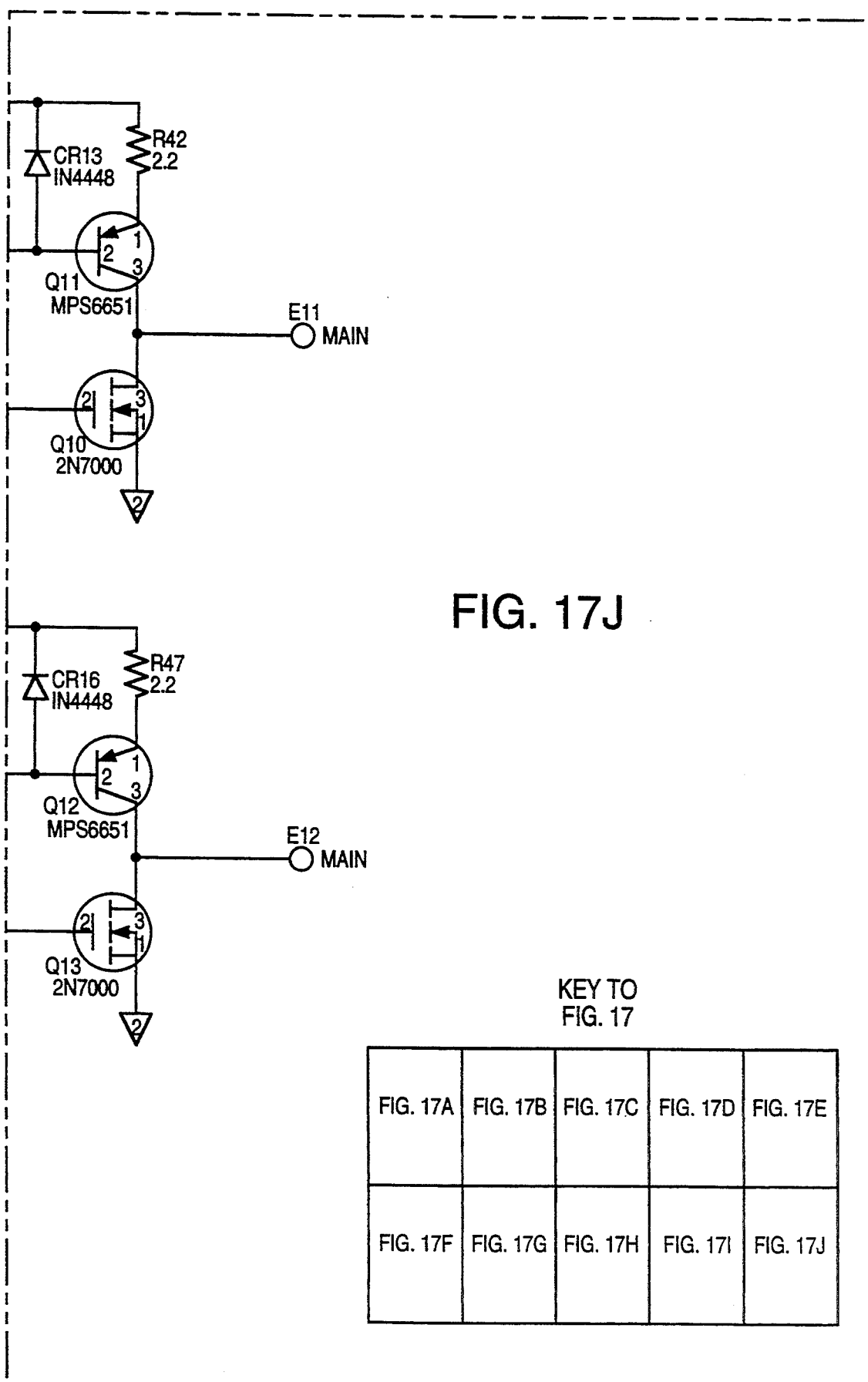

Equation 36 indicates that voltage "a'" is not a function of output current $I_{OUT}$. Voltage "a'" is therefore supplied by the output terminal of an output voltage error amplifier 26 as illustrated in FIG. 15. Therefore:

$$a' = (k_3 V_{OUT} - V_{REF})G_3 = k_4 V_{OUT}(V_{OUT}/V_{INRMS}) \quad \text{(equ. 37)}$$

$$V_{OUT}(k_3 G_1 - k_4(V_{OUT}/V_{INRMS})) = V_{REF} G_1 \quad \text{(equ. 38)}$$

If $k_3 G_1 >> k_4(V_{OUT}/V_{INRMS})$ then:

$$V_{OUT} k_3 G_1 = V_{REF} G_1$$

or:

$$V_{OUT} = V_{REF}/k_3 \quad \text{(equ. 39)}$$

Figure 4:
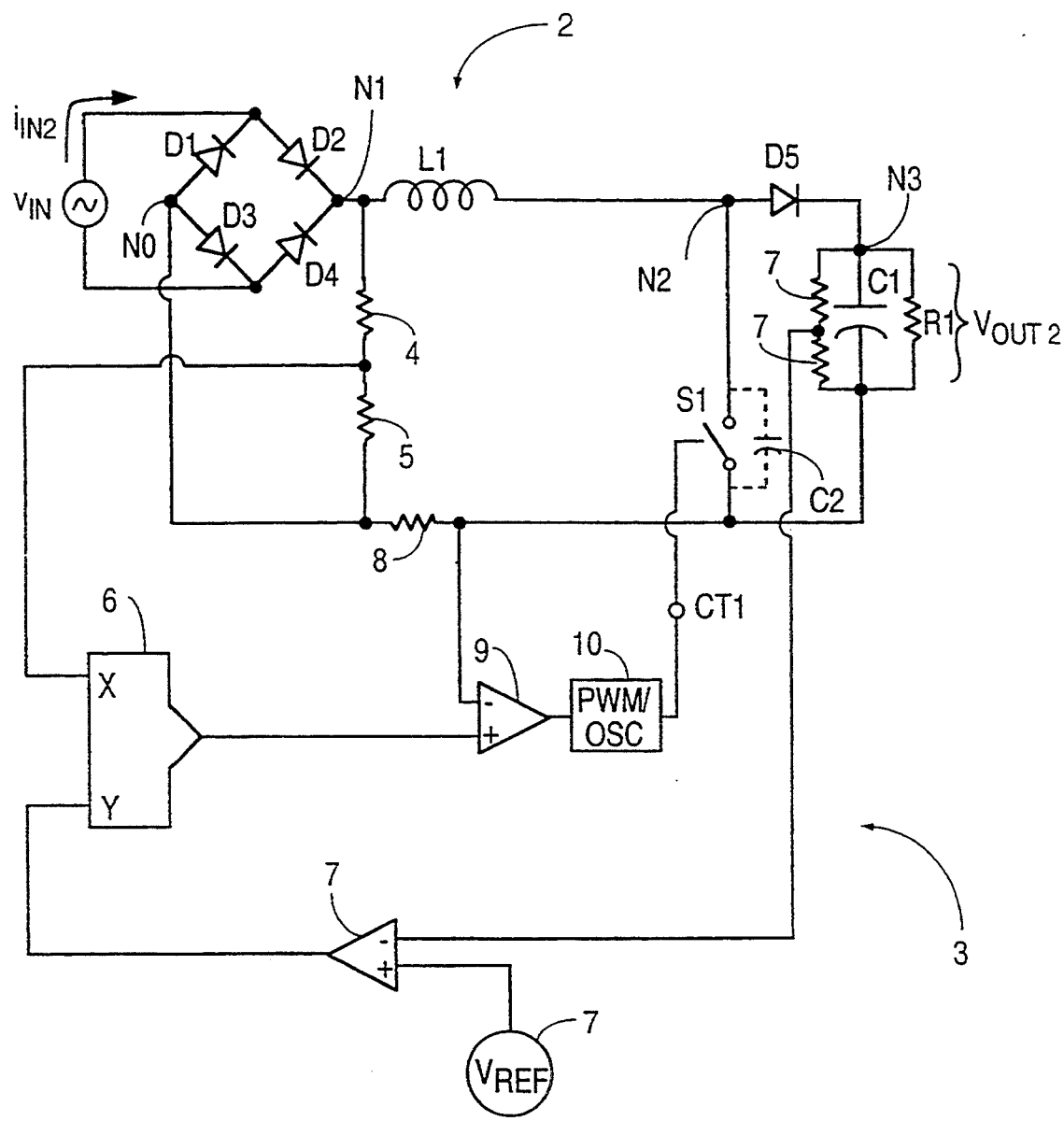
FIG. 4 (PRIOR ART) is a circuit diagram of the conventional boost converter power supply circuit of FIG. 3 being controlled to achieve power factor correction by a conventional control circuit.

Therefore the output voltage $V_{OUT}$ of a boost converter controlled by the power factor correcting boost converter control circuit of FIG. 15 is regulated to be substantially constant and independent of $I_{OUT}$ as required. The circuitry of blocks 26, 27, 30, 29 and 31 comprises a corrector circuit which corrects the voltage "a" to compensate for output current and input voltage changes. Power factor correction thereby is achieved without the use of an X-Y multiplier 6 and without the high gain feedback loop through resistor 8, amplifier 9 and pulse width modulator/oscillator 10 of the prior art of FIG. 4. Because linear X-Y multipliers may be relatively expensive to realize in integrated circuit form, the control circuit in accordance with one embodiment of the present invention which does not employ an X-Y multiplier may be advantageously implemented in integrated circuit form.

FIG. 16 is a circuit diagram showing a boost converter power supply in accordance with an embodiment of the present invention. FIG. 17 is a circuit diagram showing a power factor correcting boost converter control circuit in accordance with an embodiment of the present invention. The reference numerals of FIG. 16 are specific to FIG. 16 and the reference numerals of FIG. 17 are specific to FIG. 17, like reference numerals in the two figures do not therefore correspond to like components.

Inductor L4 of FIG. 16 corresponds with inductor L1 of FIG. 6; inductor L5 of FIG. 16 corresponds with inductor L2 of FIG. 6; diode CR3 of FIG. 16 corresponds with diode D5 of FIG. 6; capacitors C41 and C42 of FIG. 16 correspond with capacitor C1 of FIG. 6; diodes CR4A and CR4B of FIG. 16 correspond with diode D6 of FIG. 6; capacitor C7 of FIG. 16 corresponds with capacitor C3 of FIG. 6; switch Q2 of FIG. 16 corresponds with switch S2 of FIG. 6; diode CR5 of FIG. 16 corresponds with diode D7 of FIG. 6; switch Q1 of FIG. 16 corresponds with switch S1 of FIG. 6; and diodes CR1 and CR2 correspond with diodes D1–D4 of FIG. 6.

Component U1A of FIG. 17 corresponds with the amplifier of output voltage error amplifier 26 of FIG. 15; the terminal labeled VB1 in FIG. 17 corresponds with the input terminal of error amplifier 26 receiving the voltage $V_{OUT}$ in FIG. 15; resistor R10, capacitor C7 and switch Q2 of FIG. 17 correspond with resistor R6, capacitor C4 and switch 28 of FIG. 15, respectively; comparator U2A of FIG. 17 corresponds with comparator 29 of FIG. 15; the amplifier comprising resistor R13, resistor R14, and operational amplifier U1B of FIG. 17 corresponds with the circuit 30 for generating voltage $V_x$ in FIG. 15; resistor R12 and capacitor C6 correspond with the averaging circuit 31 of FIG. 15; components U2B, C12, Q3, Q4, Q7 and C19 of FIG. 17 correspond with components 20, 21, 22, 18, 23 and 19 of ramp generator circuit 16 of FIG. 15, respectively; resistors R19, R20, R35, R21 and operational amplifier U1D of FIG. 17 correspond with resistors R2, R3, R5, R4 and the operational amplifier of the subtracting amplifier block 24 of FIG. 15, respectively; and comparator U3A of FIG. 17 corresponds with comparator 25 of FIG. 15.

Although specific embodiments have been described and illustrated for educational purposes in order to explain the present invention, the present invention is not limited thereto. Types of converters other than boost converters such as SEPIC converters, Cúk converters, buck-boost converters and Zeta converters may be controlled by appropriate pulse-width modulator circuits to achieve power factor correction. Although the switch capacitance discharge circuit illustrated in FIG. 6 is disposed between diode D5 and switch S1, a switch capacitance discharge circuit could alternatively be disposed between node N2 and switch S1 or between switch S1 and node N0. In the event that a switch capacitance discharge circuit is disposed between node N2 and switch S1, at least some of the energy used to discharge capacitance C2 may be obtained from inductor L1. Circuit components other than a capacitor may be used to capture energy from a diode recovery current in order to discharge a switch capacitance and to achieve zero voltage switching. Accordingly, various adaptations, modifications, rearrangements of circuit components, and combinations of various ones of the features of the specific embodiments can be practiced without departing from the scope of the invention as set forth in the appended claims.

We claim:

1. A method, comprising the steps of:

controlling a switch of a boost converter to be conductive to conduct current flowing through an inductor during a first time period and controlling said switch to be substantially nonconductive during a second time period, current flowing through said inductor flowing through a forward biased diode to an output capacitance during said second time period, wherein a diode recovery current flows in said diode during said first time period; and during said second time period, discharging a capacitance of said switch using energy of said diode recovery current.

2. The method of claim 1, further comprising the steps of:

during a first portion of said first time period, storing energy of said diode recovery current in a second inductor;

during the remainder of said first time period and for a first portion of said second time period, transferring said energy from said second inductor to a capacitor and then back to said second inductor.

3. A circuit, comprising:

an inductor;

a switch, said inductor being coupled in series with said switch, current flowing from a first node, through said inductor to a second node, through said switch and to a third node when said switch is conductive;

a switch capacitance discharge circuit having a first terminal, a second terminal and a control terminal, said first terminal of said switch capacitance discharge circuit being coupled to said second node; a capacitor; and a diode, an anode of said diode being coupled to said second terminal of said switch capacitance discharge circuit, current flowing through said diode and into said capacitor when said diode is forward biased.

4. The circuit of claim 3, wherein said switch is conductive during a first time period, is substantially nonconductive during a second time period, and is conductive during a third time period, said switch capacitance discharge circuit comprising an inductor, said switch having an intrinsic capacitance, said inductor of said switch capacitance discharge circuit storing energy of a diode recovery current which flows in said diode after said switch is turned on to be conductive during said first time period, said energy stored in said switch capacitance discharge circuit being used to discharge said intrinsic capacitance prior to said switch being turned on to be conductive during said third time period.

5. The circuit of claim 4, wherein said switch capacitance discharge circuit further comprises a capacitor, said energy stored in said inductor of said switch capacitance discharge circuit being transferred to said capacitor of said switch capacitance discharge circuit and then back to said inductor of said switch capacitance discharge circuit prior to said intrinsic capacitance being discharged.

6. The circuit of claim 3, wherein said switch capacitance discharge circuit comprises:

an inductor having a first terminal and a second terminal, said first terminal of said inductor being coupled to said second node, said second terminal of said inductor being coupled to said diode;

a capacitor having a first terminal and a second terminal, said first terminal of said capacitor being coupled to said second node;

a first diode having a first terminal and a second terminal, said first terminal of said first diode being coupled to said second terminal of said capacitor of said switch capacitance discharge circuit, said second terminal of said first diode being coupled to said second terminal of said inductor of said switch capacitance discharge circuit;

a switch having a first terminal, a second terminal and a control terminal, said first terminal of said switch of said switch capacitance discharge circuit being coupled to said second terminal of said capacitor of said switch capacitance discharge circuit, said control terminal of said switch of said switch capacitance discharge circuit being said control terminal of said switch capacitance discharge circuit; and a second diode having a first terminal and second terminal, said first terminal of said second diode being coupled to said second terminal of said switch of said switch capacitance discharge circuit, said second terminal of said second diode being coupled to said second terminal of said inductor of said switch capacitance discharge circuit.

7. A boost converter, comprising:
an inductor;
a capacitor;
a diode coupled to control a flow of current from said inductor to said capacitor;
a switch coupled to control a flow of current through said inductor, said switch having an intrinsic capacitance, said switch being conductive during a first time period, said switch being substantially non-conductive during a second time period; and
means for discharging said intrinsic capacitance during said second time period using energy of a diode recovery current flowing in said diode during said first time period.

8. A method, comprising the steps of:
generating a first signal having a voltage amplitude proportional to "a–c" by subtracting a signal of voltage amplitude "c" proportional to an input current of a boost converter from a signal of voltage amplitude "a";
generating a second signal having a peak voltage amplitude of approximately said voltage amplitude "a", said second signal being a ramp signal;
generating a pulse width modulated control signal from said first and second signals; and
supplying said pulse width modulated control signal to a control terminal of a switch of said boost converter.

9. The method of claim 8, wherein said generating a pulse width modulated control signal step further comprises the steps of:
supplying said first signal to a first input lead of a comparator; and
supplying said second signal to a second input lead of said comparator.

10. A circuit, comprising:
a boost converter having a switch, said boost converter having an input current; and
a control circuit having an output terminal, said output terminal being coupled to said switch, said control circuit comprising:
a ramp generator circuit having in input lead and an output lead;

a subtractor circuit having an input lead and an output lead, said input lead being coupled to said input lead of said ramp generator circuit, said subtractor circuit receiving a signal indicative of said input current of said boost converter; and a comparator circuit having a first input lead, a second input lead, and an output lead, said first input lead being coupled to said output lead of said ramp generator circuit, said second input lead being coupled to said output lead of said subtractor circuit, said output lead being coupled to said output terminal of said control circuit.

11. The circuit of claim 10, wherein said boost converter has an output voltage and an input voltage, said ramp generator circuit outputting a ramp signal, said ramp signal having a peak voltage amplitude of amplitude "a", said subtractor circuit outputting a signal having a voltage amplitude substantially proportional to "a–c", "c" being a voltage amplitude substantially proportional to a magnitude of said input current of said boost converter, said comparator circuit outputting a signal having a duty cycle substantially proportional to "(a–c)/a".

12. The circuit of claim 10, wherein said boost converter generates an output voltage, said control circuit further comprising:
a voltage error amplifier circuit having a first input lead and a second input lead, said first input lead of said voltage error amplifier circuit being coupled to receive said output voltage of said boost converter, said second input lead of said voltage error amplifier circuit being coupled to receive a reference voltage.

13. The circuit of claim 10, wherein said boost converter also has an input voltage, said control circuit further comprising:
a correcting circuit having an input lead and an output lead, said input lead coupled to receive said input voltage of said boost converter, said output lead being coupled to said input lead of said ramp generator circuit.

14. The circuit of claim 10, wherein said boost converter also has an output current, said control circuit further comprising:
a correcting circuit having an input lead and an output lead, said input lead coupled to receive said output current of said boost converter, said output lead being coupled to said input lead of said ramp generator circuit.

15. The circuit of claim 10, wherein said boost converter also has an output current, an output voltage and an input voltage, said control circuit further comprising:
a correcting circuit having a first input lead, a second input lead, a third input lead, and an output lead, said first input lead coupled to receive said output current of said boost converter, said second input lead coupled to receive said output voltage of said boost converter, said third input lead coupled to receive said input voltage of said boost converter, said output lead being coupled to said input lead of said ramp generator circuit.

16. A circuit, comprising:
a boost converter having a switch, said boost converter having an input voltage $V_{IN}$ and supplying an output voltage $V_{OUT}$, said boost converter having an equivalent input resistance; and means for generating a control signal and supplying said control signal to said switch, said control signal having a duty cycle substantially equal to $(V_{OUT}-V_{IN})/V_{OUT}$, said means comparing an output voltage of a subtractor circuit to a voltage ramp of peak amplitude proportional to an output voltage error signal, whereby said equivalent input resistance of said boost converter is maintained substantially constant.

17. The circuit of claim 16, wherein said boost converter has an input current, and wherein said output voltage of said subtractor circuit has a magnitude equal to a magnitude of said output voltage error signal minus a magnitude of a signal proportional to said input current of said boost converter.

18. A pulse width modulator circuit having a voltage signal input terminal, a clock input terminal, and a pulse width modulator signal output terminal, said pulse width modulator circuit comprising:
   a voltage subtracting circuit having a first input lead and a second input lead, said first input lead being coupled to said voltage signal input terminal of said pulse width modulator circuit;
   a ramp voltage signal generator having a voltage signal input lead, a clock input lead, and a ramp voltage output lead, said voltage signal input lead of said ramp voltage signal generator being coupled to said input lead of said voltage subtracting circuit, said clock input lead of ramp voltage signal generator being coupled to said clock input terminal of said pulse width modulator circuit; and
   a voltage comparator having a first input lead, a second input lead, and an output lead, said first input lead of said voltage comparator being coupled to said ramp voltage output lead of said ramp voltage signal generator, said second input lead of said voltage comparator being coupled to said output lead of said voltage subtracting circuit, said output lead of said voltage comparator being coupled to said pulse width modulator signal output terminal of said pulse width modulator circuit.

19. The pulse width modulator circuit of claim 18 realized as an integrated circuit, said voltage signal input terminal, said clock input terminal, and said pulse width modulator signal output terminal being terminals of said integrated circuit.

20. The pulse width modulator circuit of claim 18 also having a second voltage signal input terminal, said pulse width modulator circuit further comprising:
   a voltage error amplifier having in input lead and an output lead, said input lead being coupled to said second voltage signal input terminal, said output lead of said voltage error amplifier being coupled to said second input lead of said voltage subtracting circuit and influencing a voltage on said second input lead of said voltage subtracting circuit.

21. Using a pulse width modulator circuit to control a switch of a boost converter, said pulse width modulator circuit having a voltage signal input terminal, a clock input terminal, and a pulse width modulator signal output terminal, said pulse width modulator circuit comprising:
   a voltage subtracting circuit having a first input lead and a second input lead, said first input lead being coupled to said voltage signal input terminal of said pulse width modulator circuit;
   a ramp voltage signal generator having a voltage signal input lead, a clock input lead, and a ramp voltage output lead, said voltage signal input lead of said ramp voltage signal generator being coupled to said input lead of said voltage subtracting circuit, said clock input lead of ramp voltage signal generator being coupled to said clock input terminal of said pulse width modulator circuit; and
   a voltage comparator having a first input lead, a second input lead, and an output lead, said first input lead of said voltage comparator being coupled to said ramp voltage output lead of said ramp voltage signal generator, said second input lead of said voltage comparator being coupled to said output lead of said voltage subtracting circuit, said output lead of said voltage comparator being coupled to said pulse width modulator signal output terminal of said pulse width modulator circuit.

22. A boost converter, comprising:
   a first inductor;
   a first capacitor;
   a diode coupled to allow a flow of current from said first inductor into said first capacitor when said diode is forward biased;
   a main switch coupled to control a flow of current through said first inductor, said main switch having an intrinsic capacitance; and
   means, comprising a second inductor, for discharging said intrinsic capacitance using energy captured approximately when said diode becomes reverse biased, said energy being captured in said second inductor, said second inductor being disposed in series between said diode and said main switch.

23. The boost converter of claim 22, wherein said means further comprises a second capacitor, said energy being initially captured in said second inductor, being subsequently transferred to said second capacitor, and then being transferred back to said second inductor before said intrinsic capacitance is discharged.

24. The boost converter of claim 22, further comprising a third capacitor, said third capacitor being disposed in parallel with said diode, at least a part of said energy is energy of a current flowing through said third capacitor when said diode becomes reverse biased.

25. The boost converter of claim 22, wherein at least a part of said energy is energy of a diode recovery current of said diode.

26. The boost converter of claim 22, wherein said second inductor has a first terminal and a second terminal, said first terminal being substantially directly connected to said main switch, said second terminal being substantially directly connected to said diode.

27. The circuit of claim 16 realized on an integrated circuit chip, said integrated circuit chip not comprising an X-Y multiplier.

* * * * *